(12) United States Patent
Sharma et al.

(10) Patent No.: US 9,395,762 B2
(45) Date of Patent: Jul. 19, 2016

(54) HINGE CONFIGURATION FOR AN ELECTRONIC DEVICE

(71) Applicant: Intel Corporation, Santa Clara, CA (US)

(72) Inventors: Sameer Sharma, Santa Clara, CA (US); Douglas Satzger, Menlo Park, CA (US); Gadi Amit, San Francisco, CA (US); Yoshikazu Hoshino, San Francisco, CA (US); Chadwick Harber, San Francisco, CA (US); Daniel Clifton, San Francisco, CA (US); Phil Houdek, San Francisco, CA (US); Stanislav Moiseyenko, Mountain View, CA (US); Nathan Jauvtis, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/965,206

(22) Filed: Dec. 10, 2015

(65) Prior Publication Data
US 2016/0091935 A1 Mar. 31, 2016

Related U.S. Application Data

(62) Division of application No. 13/976,381, filed as application No. PCT/US2012/066784 on Nov. 28, 2012, now Pat. No. 9,244,496.

(51) Int. Cl.
*G06F 1/16* (2006.01)
*E05D 15/50* (2006.01)
*E05D 3/12* (2006.01)

(52) U.S. Cl.
CPC .......... *G06F 1/1683* (2013.01); *G06F 1/1616* (2013.01); *G06F 1/1632* (2013.01);
(Continued)

(58) Field of Classification Search
CPC ... G06F 1/1681; G06F 1/1683; Y10T 16/528; Y10T 16/5285; Y10T 16/541; E05D 3/122
USPC .......... 361/679.27, 679.28; 16/221, 320, 230, 16/249, 254
See application file for complete search history.

(56) References Cited

U.S. PATENT DOCUMENTS

| 4,114,402 A | 9/1978 | Craig |
| 4,143,451 A | 3/1979 | Craig |

(Continued)

FOREIGN PATENT DOCUMENTS

| EP | 1780505 | 5/2007 |
| KR | 10-2004-0034405 | 4/2004 |

(Continued)

OTHER PUBLICATIONS

Dell, Dell Venue 10 7000 series, Quick start guide with picture, 2015.*

(Continued)

*Primary Examiner* — Robert J Hoffberg
*Assistant Examiner* — Michael Matey
(74) *Attorney, Agent, or Firm* — Patent Capital Group

(57) ABSTRACT

Particular embodiments described herein provide for an electronic device, such as a notebook computer or laptop, that includes a circuit board coupled to a plurality of electronic components (which includes any type of components, elements, circuitry, etc.). The electronic device may also include a hinge assembly to secure a top portion of the electronic device to an accessory. The hinge assembly is to allow a rotation of the top portion in relation to the accessory. The hinge assembly may include a plurality of discs to receive a plurality of segments of the accessory as the hinge assembly engages to secure the top portion of the electronic device to the accessory.

25 Claims, 19 Drawing Sheets

(52) U.S. Cl.
CPC ............ G06F 1/1637 (2013.01); G06F 1/1662 (2013.01); *E05D 3/122* (2013.01); *E05D 15/50* (2013.01); *Y10T 16/528* (2015.01); *Y10T 16/541* (2015.01)

(56) References Cited

U.S. PATENT DOCUMENTS

| | | | |
|---|---|---|---|
| 4,144,765 A | 3/1979 | Aske | |
| 4,380,108 A | 4/1983 | Craig | |
| 7,308,733 B2 | 12/2007 | An et al. | |
| 8,498,100 B1 | 7/2013 | Whitt et al. | |
| 2001/0009499 A1 | 7/2001 | Carlson | |
| 2003/0223185 A1 | 12/2003 | Doczy et al. | |
| 2004/0090742 A1 | 5/2004 | Son et al. | |
| 2005/0117286 A1* | 6/2005 | Karashima | G06F 1/1616 361/679.28 |
| 2005/0122671 A1 | 6/2005 | Homer | |
| 2006/0288534 A1 | 12/2006 | Lu | |
| 2007/0077972 A1 | 4/2007 | Tu | |
| 2008/0311962 A1 | 12/2008 | Demuynck | |
| 2009/0141439 A1 | 6/2009 | Moser | |
| 2010/0123663 A1 | 5/2010 | Leung | |
| 2010/0265648 A1 | 10/2010 | Hirabayashi | |
| 2011/0122556 A1* | 5/2011 | Cheng | G06F 1/1616 361/679.01 |
| 2012/0019041 A1* | 1/2012 | Leconte | B60N 2/2252 297/463.1 |
| 2012/0066865 A1 | 3/2012 | Lauder et al. | |
| 2013/0219661 A1* | 8/2013 | Ge | G06F 1/1681 16/367 |
| 2013/0335330 A1 | 12/2013 | Lane et al. | |
| 2014/0085793 A1 | 3/2014 | Zawacki et al. | |

FOREIGN PATENT DOCUMENTS

| | | |
|---|---|---|
| KR | 10-2006-0006586 | 1/2006 |
| KR | 10-2012-0038415 | 4/2012 |
| TW | M292234 | 6/2006 |
| TW | M439836 | 10/2012 |
| WO | 00/17736 | 3/2000 |

OTHER PUBLICATIONS

PCT International Search Report and Written Opinion received for PCT Patent Application No. PCT/US2012/066784, mailed on Jun. 2, 2013, 14 pages.
PCT International Preliminary Report on Patentability in PCT International Application Serial No. PCT/US2012/066784 mailed on Jun. 2, 2015.
Korean Patent Office Notice of Preliminary Rejection in Application No. 2014-7017700 mailed on Feb. 5, 2016.
Russian Patent Office Action in Russian Patent Application Serial No. 2014126086 mailed on Apr. 14, 2015.
Taiwan Patent Office Official Letter in Taiwan (R.O.C.) Patent Application No. 102141064 mailed on Dec. 18, 2015.

* cited by examiner

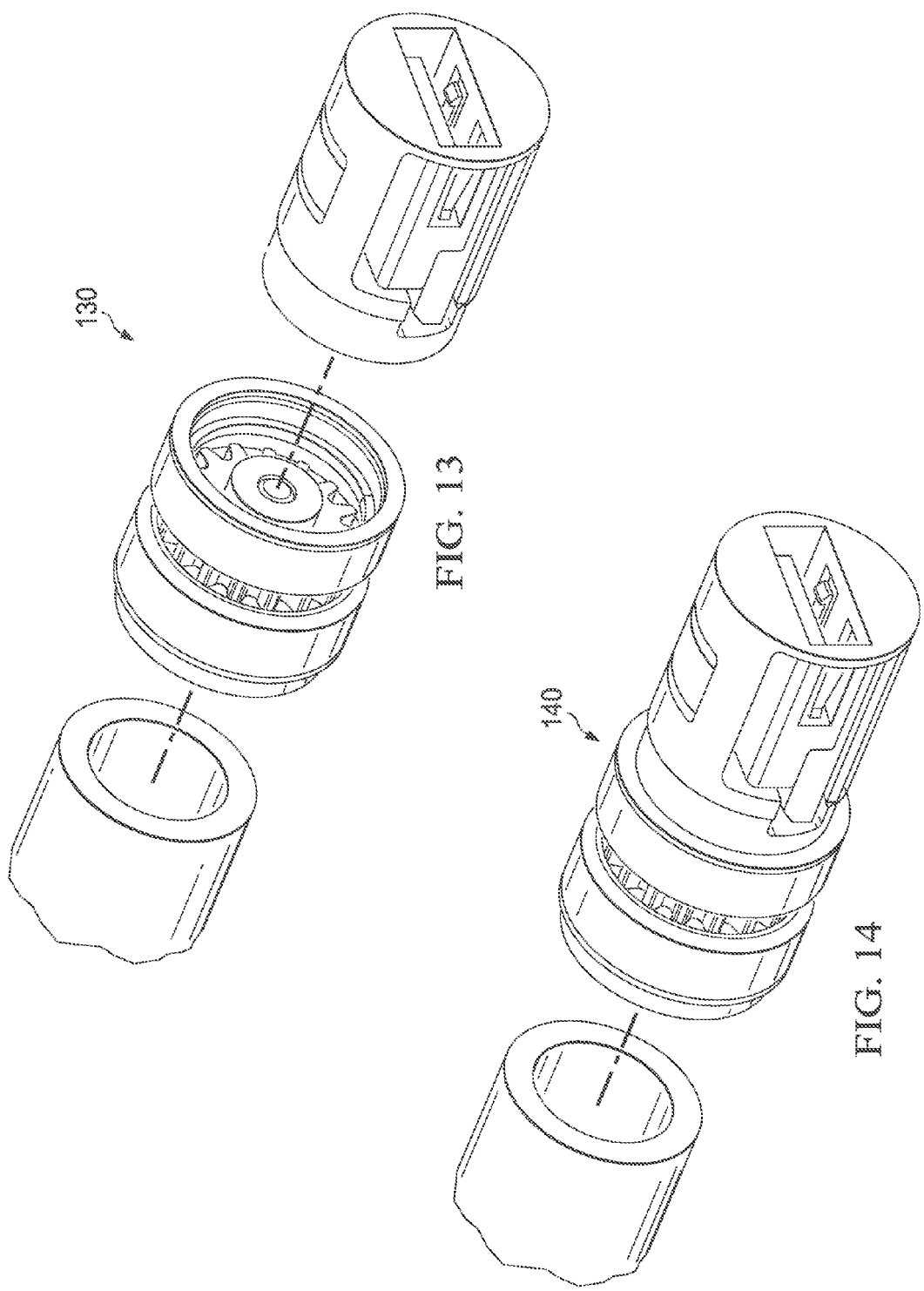

HINGE CONFIGURATION FOR AN ELECTRONIC DEVICE

CROSS-REFERENCE TO RELATED APPLICATIONS

This Application is a divisional of U.S. patent application Ser. No. 13/976,381, filed Jun. 26, 2013, which is a national phase entry of PCT/US2012/066784, filed Nov. 28, 2012. These priority applications are included by reference herein in their entireties.

TECHNICAL FIELD

Embodiments described herein generally relate to hinge configurations for an electronic device.

BRIEF DESCRIPTION OF THE DRAWINGS

Embodiments are illustrated by way of example and not by way of limitation in the FIGURES of the accompanying drawings, in which like references indicate similar elements and in which:

FIGS. 11-14 are simplified schematic diagrams illustrating certain hinge assembly components associated with the electronic device;

Figure 1A:
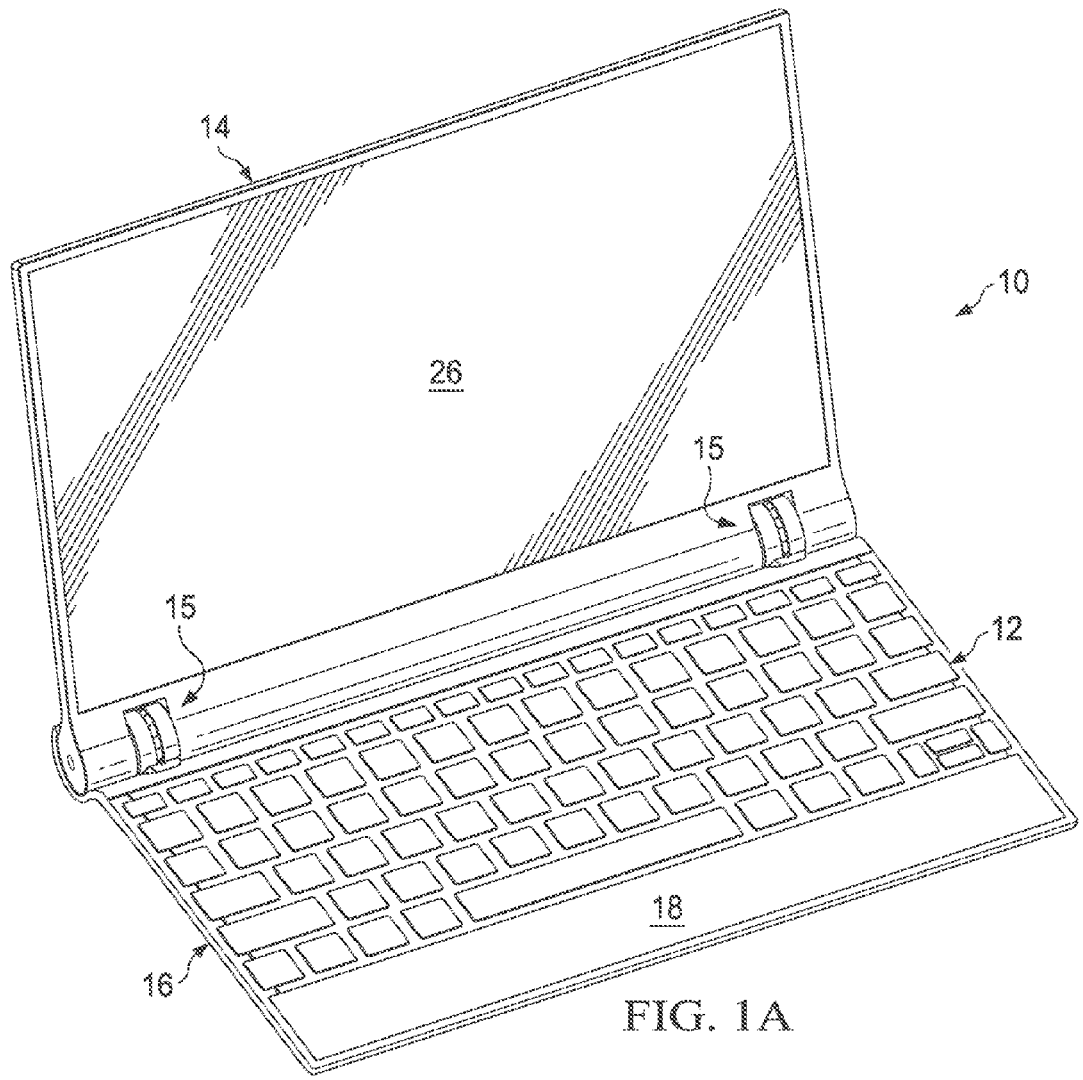
FIG. 1A is a simplified schematic diagram illustrating an embodiment of an electronic device in an open configuration with an attached keyboard, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to hinge configurations for an electronic device. Features such as structure(s), function(s), and/or characteristic(s), for example, are described with reference to one embodiment as a matter of convenience; various embodiments may be implemented with any suitable one or more of the described features.

Traditionally, tablet devices and their associated accessories exist with minimal integration. A keyboard accessory, for example, is often an afterthought that requires a combination of elastic and/or magnets to connect the two disparate components having no power integration between them (e.g., no power integration between a tablet and a keyboard accessory). Docking the tablet to the accessory can provide a limited range of motion for angling the tablet in a laptop usage orientation, or only provide fixed angular orientations. In addition, the keyboard-device interaction may only allow one orientation of the keyboard to the device when connected (i.e., the device screen only faces the keyboard). This configuration stifles the user's flexibility, along with hindering the overall user experience of the device during laptop orientation usage.

Particular embodiments described herein provide for an electronic device, such as a notebook computer, laptop, cellphone, or other mobile device that includes a circuit board coupled to a plurality of electronic components (which includes any type of components, elements, circuitry, etc.).

The electronic device may also include a base portion and a top portion coupled to the base portion at a hinge configured such that the base portion and the top portion can rotate between an open configuration of the electronic device and a closed configuration of the electronic device (and hold positions with respect to one another at points in between open and closed). Certain embodiments presented herein can offer an effective hinge and docking capability that provides an orientation flexibility and connection to enable a more extensive integration between the electronic device (e.g., a tablet) and an accessory (e.g., a keyboard, audio system, a movie player system, a docking station, accessory cover, etc.).

The electronic device may also include a hinge assembly to selectively secure (e.g., based on a desired configuration) a top portion of the electronic device to an accessory. The hinge assembly is to allow a rotation of the top portion in relation to the accessory. The hinge assembly includes one or more discs to receive one or more segments of the accessory, as the hinge assembly engages to secure the top portion of the electronic device to the accessory. In more particular embodiments, the hinge assembly includes a disc-toothed wheel to receive the one or a plurality of segments of the accessory in order to secure the top portion to the accessory. Additionally, the accessory may include one or more rib segments to provide an alignment function, as the hinge assembly of the device engages the accessory (providing increased strength and stiffness to this area of the accessory). In an embodiment that includes magnets in this particular region of the accessory, these rib segments can provide the additional function of focusing the magnetic force of the magnets. In addition, the accessory may include one tooth (or a plurality of teeth features) to provide resistance to a rotational motion between the hinge assembly and the accessory, allowing them to hold their relative positions without user interaction. In addition, the accessory may include one or more magnetic bands that attract one or more rings provided in the top portion.

In an embodiment, the accessory docking features of the accessory do not include magnets. Instead, the device can be retained by the accessory at the hinge connection point by the accessory engaging features of the electronic device with an over center (or other type of) mechanical snap retention.

In yet other embodiments, an electronic device is provided that includes a hinge assembly to selectively secure a top portion of the electronic device to an accessory. The hinge assembly is to allow a rotation of the top portion in relation to the accessory, and the hinge assembly includes at least a three-piece snap configuration (or a four-piece, a five-piece, etc.) that is to provide a retention force between the top portion and the accessory. Power signals can be run separately through each of the three pieces of the three-piece snap configuration. Alternatively, the power signals can be run through a middle piece of the three-piece snap configuration, and two outer pieces of the three-piece snap configuration can be insulators. The accessory can be a keyboard that includes a keyboard side snap with one piece, and a plurality of slots can be provided to allow an independent motion of outer snap bands of the keyboard.

Hinge Configuration for Electronic Device

FIG. 1A is a simplified schematic diagram illustrating an embodiment of an electronic device 10 in an open configuration in accordance with one embodiment of the present disclosure. Electronic device 10 may include a base portion 16, comprising a keyboard 12, a touchpad 18, and a top portion 14, comprising a display 26 and one or more discs 15. Display 26 may be disposed within/on and/or supported by top portion 14. In one or more embodiments, display 26 is a screen that can be a liquid crystal display (LCD) display screen, a light-emitting diode (LED) display screen, an organic light-emitting diode (OLED) display screen, a plasma display screen, or any other suitable display screen system.

In one or more embodiments, electronic device 10 is a notebook computer or laptop computer. In still other embodiments, electronic device 10 may be any suitable electronic device having a display such as a mobile device, a tablet computer and/or a tablet device (e.g., an i-Pad), a personal digital assistant (PDA), a smartphone, an audio system, a movie player of any type, a computer docking station, etc.

In general terms, electronic device 10 can offer a suitably comfortable grip for an end user to manipulate base portion 16 (e.g., to separate it from top portion 14). Electronic device 10 may also include one or multiple discs 15 that enable an integrated detachable accessory solution from mechanical, electrical, and aesthetica) standpoints. The accessory band design feature can provide mechanical and magnetic lead-in guidance and attraction force for retention during docking. Additionally, electronic device 10 may use a mechanical snap-in feature to easily attach, retain, and detach any accessory. The power of electronic device 10 can be physically isolated from its chassis and/or, further, it can be integrated within one or more of its disc assemblies. Moreover, electronic device 10 can offer docking that allows power and/or data to flow between the device and the accessory (e.g., keyboard) to which it is docked. In addition, electronic device 10 can offer a space saving integration of a clutch mechanism residing inside the volume of the disc feature. Additionally, electronic device 10 can offer an improved range of motion for the display when the device is oriented in a laptop mode, as detailed below.

Electronic device 10 may also include a middle portion that is provided between base portion 16 and top portion 14. The middle portion may aesthetically cover a portion of hinges 15 (or be proximate to multiple hinges 15) existing between base portion 16 and top portion 14. Hinges 15 can define an axis of rotation that is shared between base portion 16 and top portion 14. In one embodiment, base portion 16 and top portion 14 are hingedly coupled via one or more hinges 15 (as shown).

In the particular embodiment shown in FIG. 1A, electronic device 10 is a relatively thin and sleek tablet having a touch screen (e.g., 10-inch screen) and a detachable and re-attachable keyboard accessory. Electronic device 10 provides for an integrated device that can include a display section (containing a main logic board and barrel installed batteries) and a keyboard section. In addition, its hinge mechanism allows the display section to be attached to the keyboard in two different orientations: the display facing inward and the display facing outward. This mechanism can provide multiple modes (possible configurations), such as a laptop mode, tablet mode, movie mode (as well as closed mode) to a user. All of these configurations are discussed below with reference to various FIGURES that further illustrate some of the operational capabilities associated with electronic device 10.

For the particular magnetic keyboard design, it should be noted that the keyboards that are currently available for tablets do not offer a suitable user experience. Typing on glass is ergonomically uncomfortable and, separately, typical Bluetooth keyboards are thick and cumbersome. In contrast to those flawed systems, the keyboard option for electronic device 10 can provide a user experience that replicates a more traditional computer keyboard experience. Additionally, from the perspective of the user, the key travel feels like a common computer keyboard (e.g., travel could be approximately 0.5 mm vs. 2.5 mm on a traditional computer keyboard, but feels the same). Moreover, there is enough separation between the keys to make it easier for touch-typers to distinguish between keys for improved touch-typing.

In a particular embodiment, the keyboard is an ultra-thin (e.g., 3.30 mm), ultra-light (e.g., 275 grams) keyboard with sufficient keyboard band stiffness and strength to serve as a tablet device cover. The keyboard can be made from a laminate construction that uses variations of key design shapes and magnets to replicate a touch-typing user experience with the feel of a typical computer keyboard. In order to account for the thinner side areas of the keyboard device, the keyboard edge keys may be pivoted on one side and, further, may have magnets only on one side in a particular embodiment of the present disclosure. The keys can be of any suitable type such as toggle operation keys, for example, with an arrow key operation that merges four keys that cannot move diagonally. A magnet can be provisioned at various locations of the keyboard (e.g., away from the center of the keys).

In operation, the spacing between the keys of the keyboard can enable a touch-typer to easily distinguish between keys with fingers. Edge keys can be specially designed for thinner sides and, further, utilize varying magnet configurations. An edge key configuration allows keys to hang over the edge of the support base to accommodate the thinner sides of the keyboard device. Magnets can be suitably positioned to minimize the toggle affect. Toggle key configuration is used with the arrow keys.

For the magnetic keys, the use of magnets embedded within the keys and attracted to a ferrous top plate above the sides of the keys can provide the user with the sense of a traditional computer keyboard key travel and rigidity. The keyboard can also provide a physical keystroke confirming the depression of the key. In certain implementations, the keyboard keys are magnetically biased upward with electrically conductive pads beneath the keys, which trigger a key press. For the actual keyboard construction, a laminate construction may be employed in conjunction with an injection mold, where the metal is integrated into the plastic. A flexible printed circuit board (FPC) can also be used in certain embodiments of the present disclosure. Connections can be formed to the bands and a small battery may be optionally inserted into the keyboard to provide a limited backup power supply. In one non-limiting example, the tablet keyboard dimensions are approximately: 261.40 mm(X)×170.16 mm(Y)×3.30 mm (Z, key top-to-bottom surface). Other embodiments of the keyboard can include any suitable dimensions, sizes, and shapes: all of which are encompassed by the present disclosure.

Note that any number of connectors (e.g., Universal Serial Bus (USB) connectors (e.g., in compliance with the USB 3.0 Specification), Thunderbolt™ connectors, WiFi connectors, a non-standard connection point such as a docking connector, etc.) and a plurality of antennas can be provisioned in conjunction with electronic device 10. [Thunderbolt™ and the Thunderbolt logo are trademarks of Intel Corporation in the U.S. and/or other countries.] The antennas are reflective of electrical components that can convert electric currents into radio waves. In particular examples, the antennas can be associated with WiFi activities, wireless connections more generally, small cell deployments, Bluetooth, 802.11, etc.

In one example embodiment, the motherboard of electronic device 10 is a general circuit board that can hold various components of the internal electronic system of electronic device 10. The components may include a central processing unit (CPU), a memory, etc. The motherboard can also couple to one or more connectors in order to accommodate other peripherals sought to be used by a user of electronic device 10. More specifically, the motherboard can provide the electrical connections by which the other components of the system can communicate.

Any processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

In a particular embodiment, touchpad 18 is a pointing device that features a tactile sensor, a specialized surface that can translate the motion and position of a user's fingers to a relative position on screen. Touchpad 18 can be used in place of a mouse (e.g., where desk space is scarce or based on user preference). Touchpad 18 can operate using capacitive sensing, conductance sensing, or any other appropriate sensing technology. In a particular embodiment, a suitable battery can be provisioned proximate to touchpad 18 in order to power its operations. In addition, either surface (or both surfaces) of display 26 can be a touch display that uses any of the technologies discussed herein.

Figure 1B:
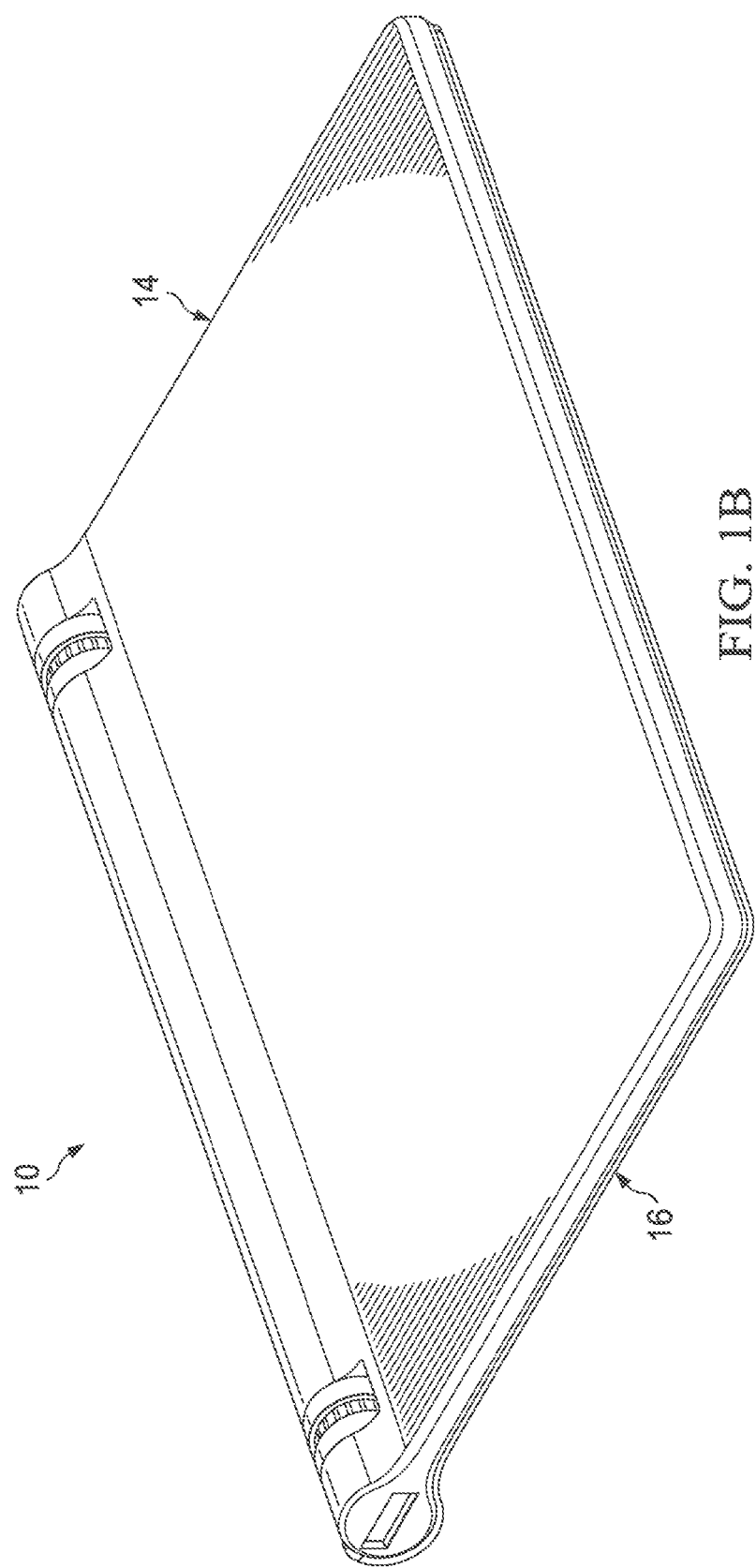
FIG. 1B is a simplified schematic diagram illustrating an embodiment of an electronic device with an attached keyboard, in a closed configuration in accordance with one embodiment of the present disclosure.

Turning briefly to FIG. 1B, FIG. 1B is a simplified schematic diagram illustrating a side view of electronic device 10 in a closed configuration. In operation, when electronic device 10 is in a closed position, the thin plastic keyboard can protect the display. When the display section is flipped up to an open position, it operates in a traditional laptop orientation (i.e., a keyboard resting on a surface with a display held in an upright position). In a particular embodiment, electronic device 10 includes an 18.5 mm pitch full-size keyboard that provides for an optimal touch-typing experience. When the display section is flipped upside-down to face outwardly away from the key elements of the keyboard, electronic device 10 can operate in a tablet configuration with the keyboard nested behind the screen and out of the way of user interaction. Its barrel-shaped hinge mechanism feature can serve as an ideal grip for the end user. In this mode, the keyboard can be stowed behind the display. In the tablet mode, the display can still be flipped up. In this mode, the keyboard can operate as a stand (behind the display), and the device can become a stationary display (e.g., movie mode). When the display section is detached from the keyboard, it can function as a simple lightweight tablet by itself.

In the case where the accessory of electronic device 10 is a keyboard, then the keyboard main components can include various elements. For example, the keyboard can include a keyboard body reflective of a unibody-molded part that may use insert and/or comolding methods to eliminate visible fasteners. In addition, the keyboard body may further include insert-molded band features to provide stiffness to the outer portion of the scoop geometry as well as transmit rotational loads, which inhibit top portion 14 from rotating with respect to bottom portion 16. Also provided are one or more band features that can provide for a magnetic attraction of the ferrous disc shaped features of the tablet. Electrical current can be passed from the tablet to the keyboard to recharge an on-board battery or capacitor, or power any number of items (e.g., a Bluetooth radio). Additionally, the tablet can be suitably anchored to the keyboard to prohibit a toothed disc feature from rotating with respect to the keyboard, while allowing the tablet to concentrically rotate in the "scoop" part of the keyboard through one or more clutch elements in the tablet.

For the actual keys, in a particular non-limiting embodiment, the keys are configured with a 0.5 mm travel distance (for individual keys). In addition, tactile feedback can be provided (e.g., 70 gram with "cliff drop" force deflection feel) to mimic the typing experience of traditional keyboards. In certain implementations, there is little (or no) dead space on the key surface. There can be various types of keys on the keyboard. For example, the keyboard can include pivoting keys (e.g., left edge: tilde, tab, caps lock, shift, left ctrl; right edge: backspace, backslash, enter, shift), rocking keys such as the arrow keys, and substantially vertical travel keys such as function keys and other keys that are not along the right or left edge, etc.

Electronic device 10 can also include a nonferrous web that provides sufficient stiffness to the keyboard body. The web can provide a guide for keys to move vertically, but appropriately restrain x-y motion. In addition, a ferrous top plate can increase the stiffness of keyboard, retain keys from falling out, and attract magnetic keys to bias them upwards.

In terms of Bluetooth capability, the power can reach the radio by passing current through the bands/socket. The tablet can include electrically protected (but "hot") toothed discs. The Bluetooth radio circuit board can have a direct current (DC) rectifier to power the electronics independent of the orientation of the tablet (i.e., laptop mode vs. tablet mode, etc.).

Figure 1C:
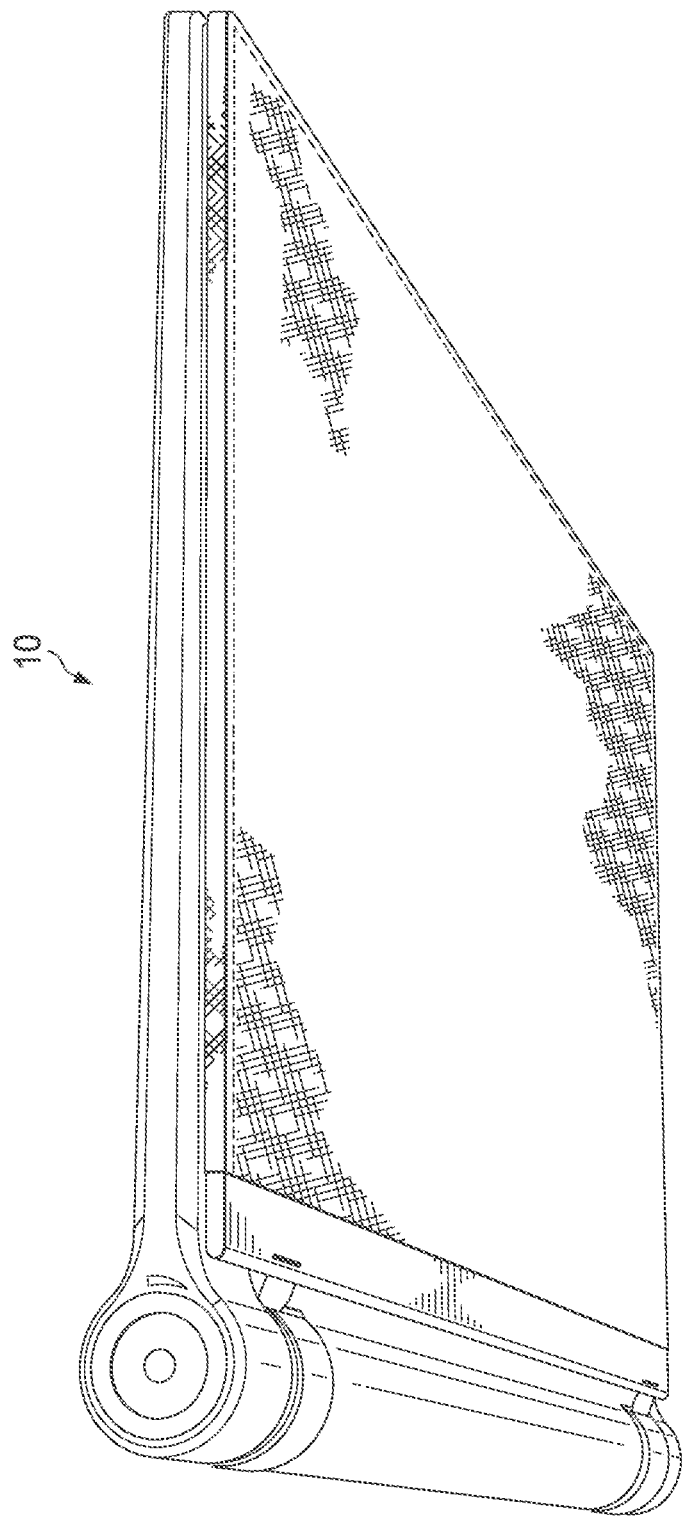
FIG. 1C is a simplified schematic diagram illustrating an embodiment of an electronic device in a closed configuration with an attached accessory cover, in accordance with one embodiment of the present disclosure.

In certain example embodiments, the design of electronic device 10 can allow a tablet to connect to the keyboard in both a laptop type mode and a tablet type mode, in addition to a movie stand type mode. The range of viewing angle adjustment is continuous (e.g., extending between 0 and 125°, or 150°, or more, or different ranges may be provided). 0° can correspond to the fully closed position, whereas 125° or similar can be defined as fully opened. There are two socket modules built into the tablet side of the device, which are magnetically attracted to the nesting features built into the keyboard. FIG. 1C is a simplified schematic diagram illustrating an embodiment of electronic device 10 in a closed configuration with an attached accessory cover in accordance with one embodiment of the present disclosure.

Figure 2:
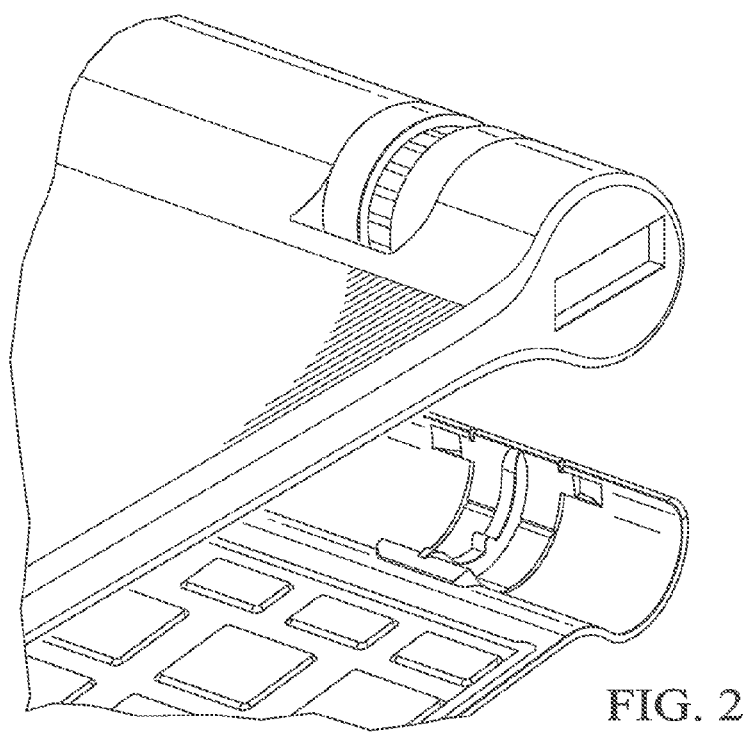
FIG. 2 is a simplified schematic diagram illustrating an orthographic view of the electronic device shown separated into two segments.
Figure 3:
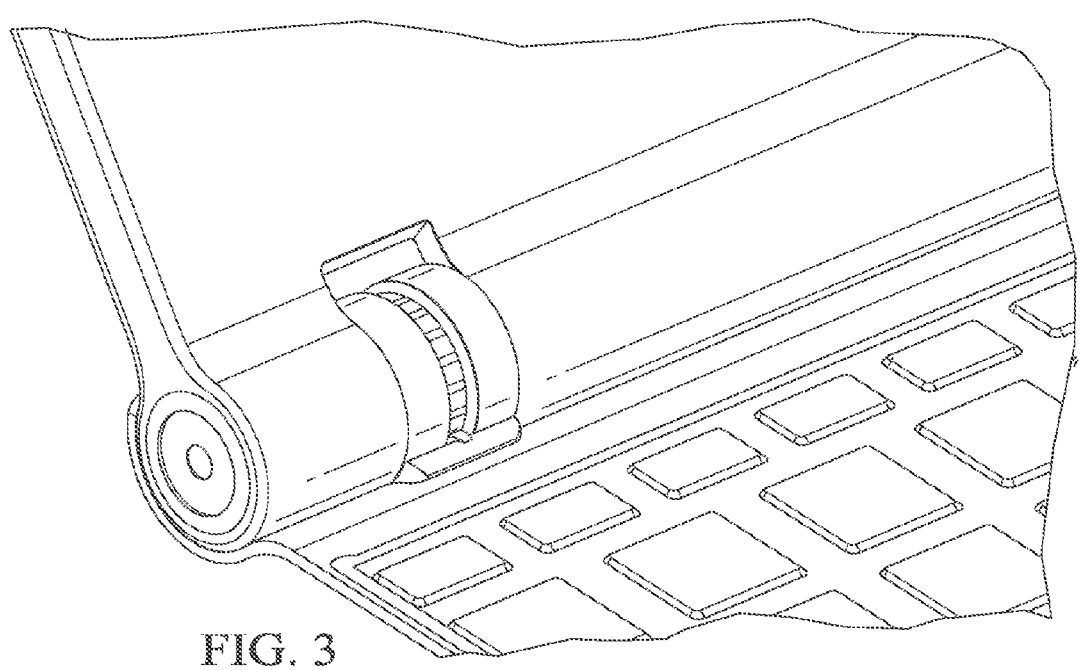
FIG. 3 is a simplified schematic diagram illustrating an orthographic view of the electronic device when the two segments are connected together.

FIG. 2 is a simplified schematic diagram illustrating an orthographic view of electronic device 10 being separated into two segments. FIG. 3 is a simplified schematic diagram illustrating an orthographic view of the electronic device when the two segments are connected together.

Focusing for a moment on the disc clutch, the specific design of electronic device 10 integrates the clutch element the resides inside the volume of the disc features of the electronic device and, further, saves space by incorporating elements of the disc into the clutch (i.e., a toothed wheel). In general, the design and assembly mechanism allows the tablet disc sub-assembly to be installed into a slot in the tablet enclosure that is smaller in width than the disc sub-assembly in its installed configuration. The actual disc can be designed with an electrical power connection that is physically isolated from the chassis. Additionally, electronic device 10 offers a friction clutch integration with a disc-toothed wheel feature in the center (or other location) of the disc features in the electronic device (e.g., for improved range of motion, more compact size, position hold capabilities, and better torque transition characteristics).

The magnetic band segments in the accessory (e.g., the keyboard) can attract the ferrous rings of the tablet discs. The center rib (discussed in detail below) provides an amplified magnetic strength focused into the band. During insertion of top portion 14 into bottom portion 16, the center toothed wheel features of the tablet disc, which are connected to the clutch, engage the tooth at the center of the accessory scoop. The center rib of the accessory scoop can serve to provide a suitable alignment lead-in function. The encasing can provide a directional focus for the magnetic field. In a particular embodiment, a clutch with bidirectional uniform torque properties is provisioned in the disc. This can allow top portion 14 to be inserted into bottom portion 16 in either orientation and, further, provide the uniform resistance to motion. This is in contrast to a typical standard laptop clutch, which may provide less resistance in one direction or variable resistance based on the angle between the screen and the keyboard.

Figure 4:
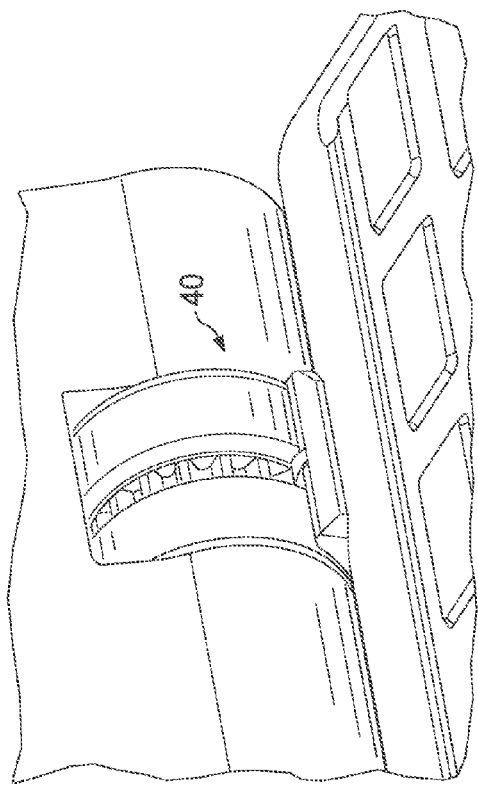
FIG. 4 is a simplified orthographic view of a disc feature of the electronic device.
Figure 5:
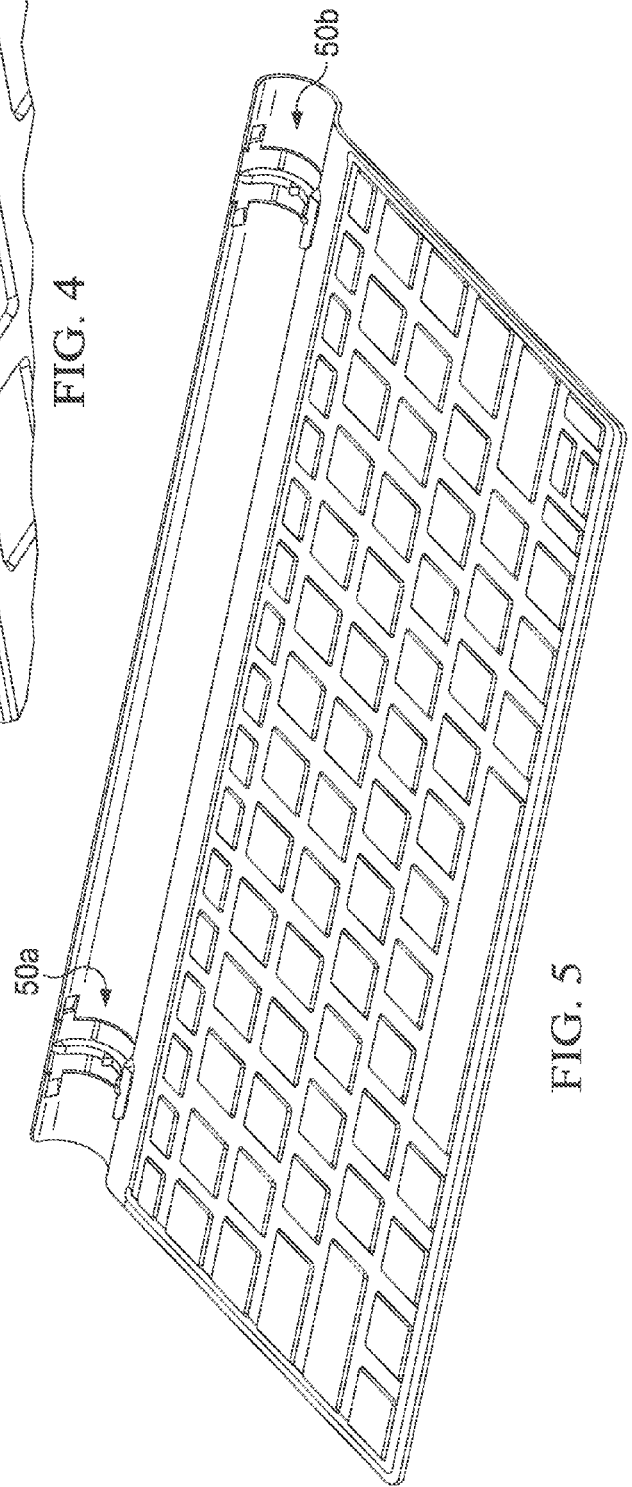
FIG. 5 is a simplified schematic diagram illustrating an orthographic view of an accessory of the electronic device in accordance with one example implementation.

FIG. 4 is a simplified orthographic view of a disc groove 40 of electronic device 10. In this particular embodiment, disc groove 40 can be in the range of 1.0-3.5 millimeters, although alternative embodiments could have any other suitable dimension. FIG. 5 is a simplified schematic diagram illustrating an orthographic view of a potential accessory of electronic device 10 in accordance with one example implementation. This particular embodiment includes symmetrical segments 50a-50b that can engender a suitable coupling for a given accessory. For example, an accessory such as a keyboard, when attached, becomes integrated to allow power to flow between the tablet's disc mechanism and the keyboard and, thus, power the Bluetooth radio embedded in the keyboard.

Figure 6:
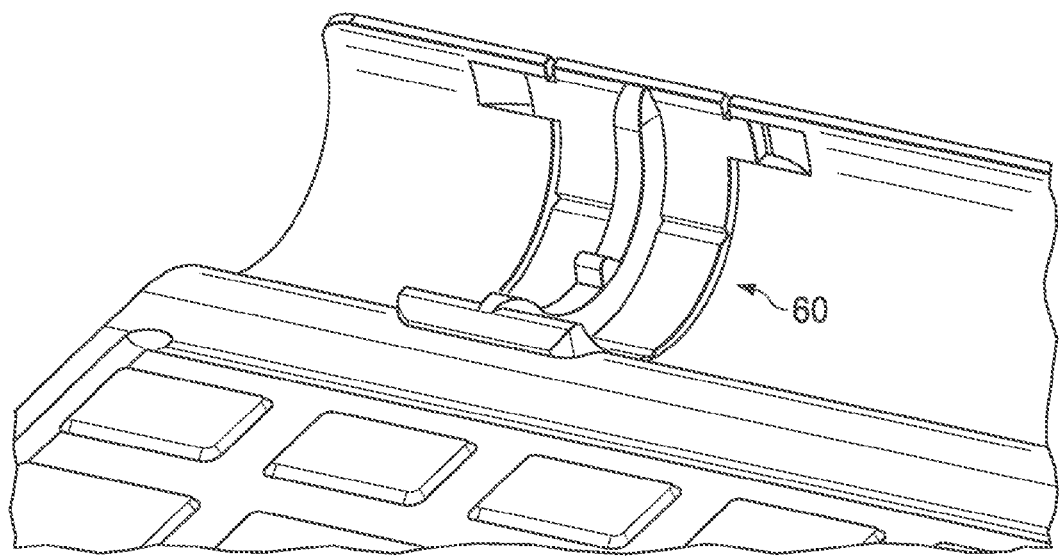
FIG. 6 is a simplified schematic diagram illustrating an orthographic view of the front of an accessory dock connection feature of an accessory device in accordance with one embodiment of the present disclosure.
Figure 7:
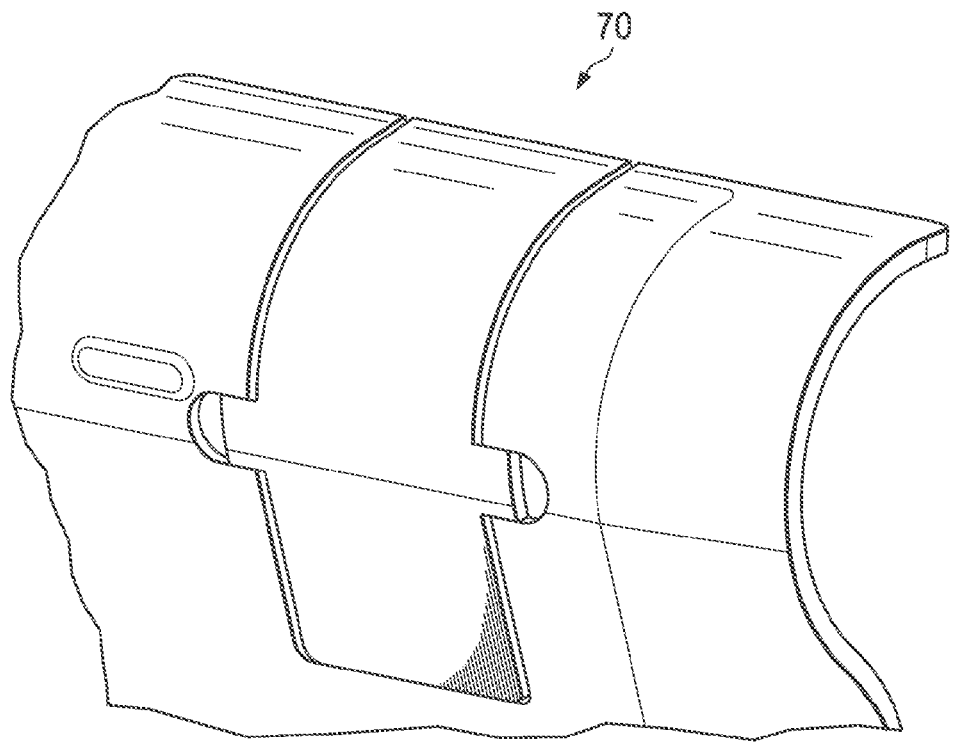
FIG. 7 is a simplified schematic diagram illustrating a view of the rear of an accessory dock connection feature of an accessory device in accordance with one embodiment of the present disclosure.

FIG. 6 is a simplified schematic diagram illustrating an orthographic view of an accessory dock 60 of electronic device 10 in accordance with one embodiment of the present disclosure. Accessory dock 60 can provide a suitable lead-in/guidance feature during connection activities. FIG. 7 is a simplified schematic diagram illustrating the underside of the accessory band components associated with electronic device 10. Magnet components 70 on the opposite side (and installed in the band) may be accompanied by a suitable backing (e.g., a steel backing) to reduce unwanted stray magnetic fields. Without such a backing, magnetic forces would have an increased likelihood of interaction with other components, alter credit card information, corrupt certain storage elements, etc. The shape of the band/keyboard and the tablet transition can allow for a cam-out release of the tablet from the keyboard by using the tablet as a lever to overcome the strong magnetic pull force of the connection. The magnetic pull from the keyboard to the tablet can ensure an electric contact and mechanical connection between the keyboard bands and the tablet. The clutch assembly can be electrically isolated from the tablet and keyboard enclosures to allow positive and negative connections between the tablet and the keyboard made through the two clutches. The physical contact of the toothed wheel features of the tablet disc elements to the torque transmission tooth of the keyboard bands allows for electrical power and/or signals to pass from the tablet to the keyboard. The toothed disc can suitably transmit torque from the keyboard to the tablet. Additionally, certain embodiments may use a plastic-housed clutch element to electrically isolate the toothed disc from the chassis.

Figure 8:
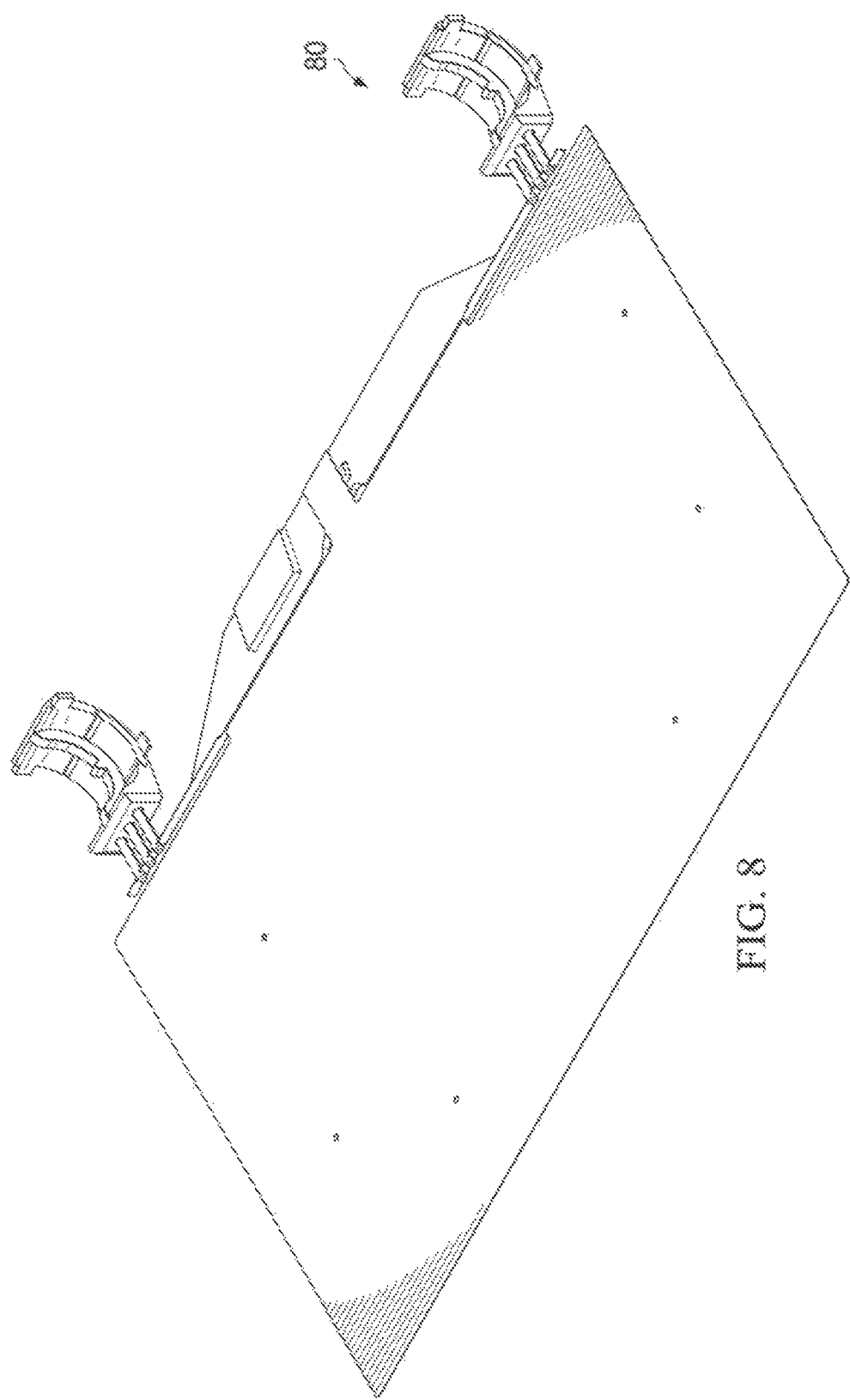
FIG. 8 is a simplified schematic diagram illustrating an orthographic view of an embodiment that includes an integration of an accessory dock connection feature with its magnetic band segments that attract disc elements of the electronic device.
Figure 9:
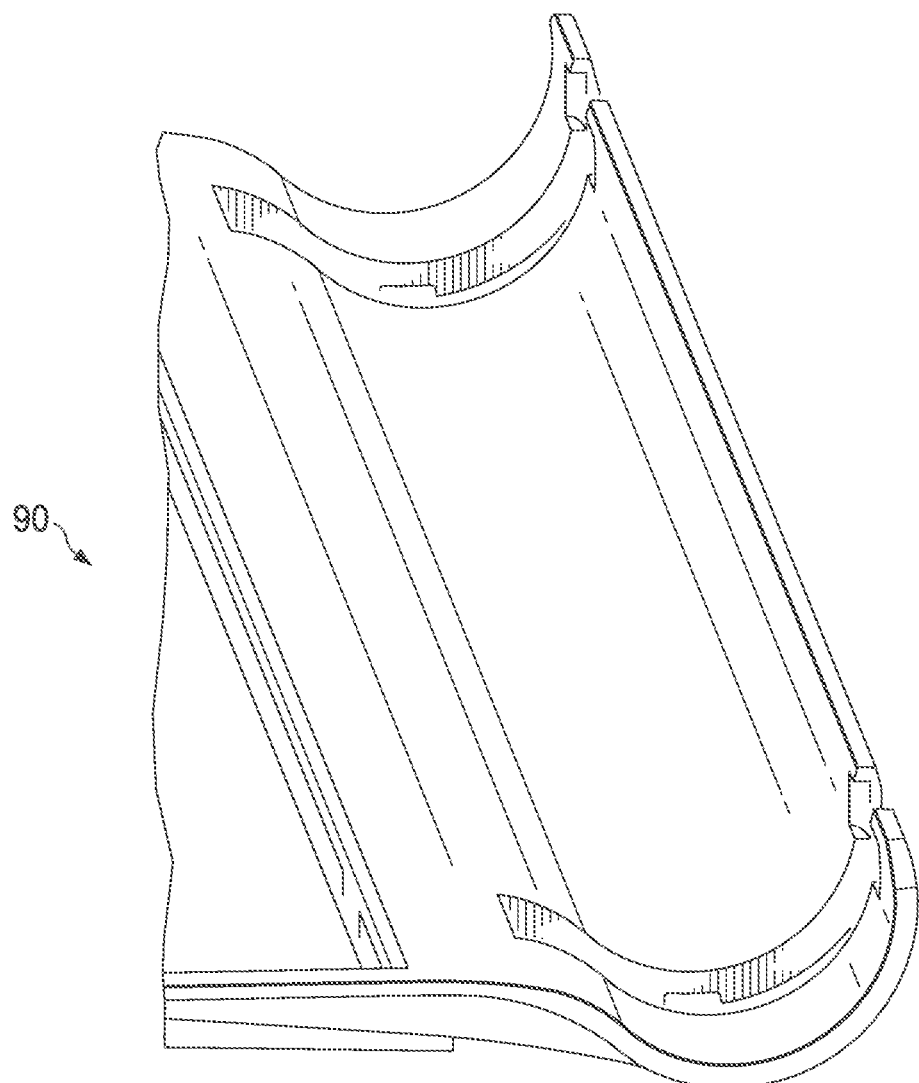
FIG. 9 is a simplified schematic diagram illustrating an orthographic view showing an embodiment of an accessory device without the accessory dock connection features.
Figure 10:
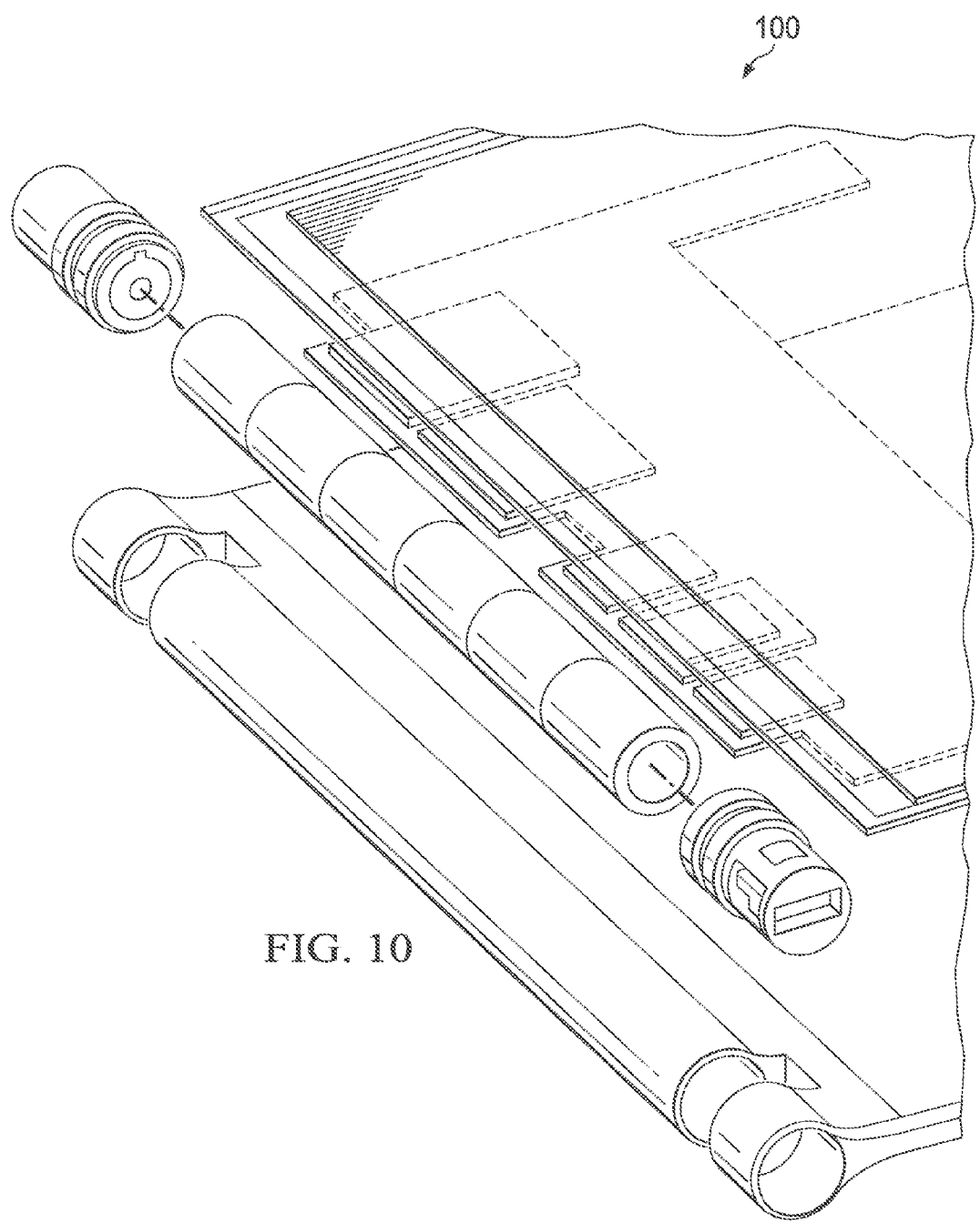
FIG. 10 is a simplified schematic diagram illustrating a hinge assembly associated with the electronic device.
Figure 12:
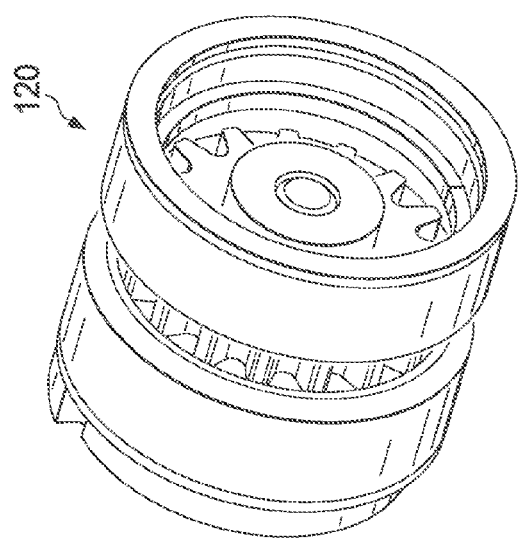
Figure 11:
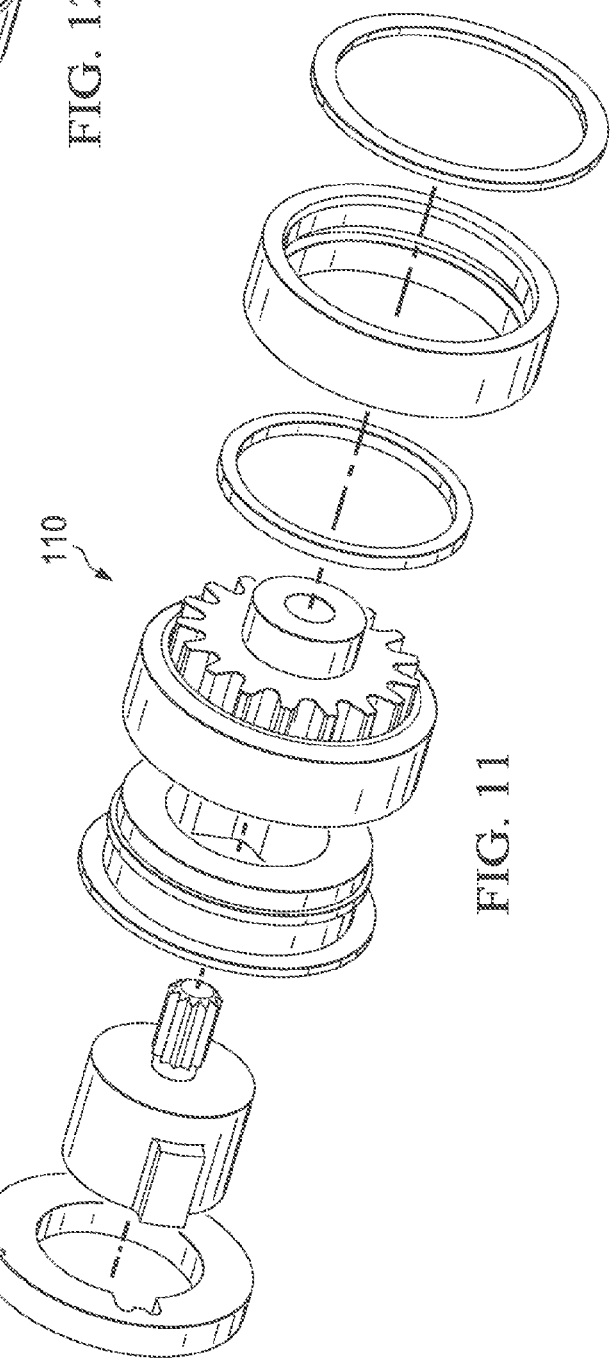
Figure 15:
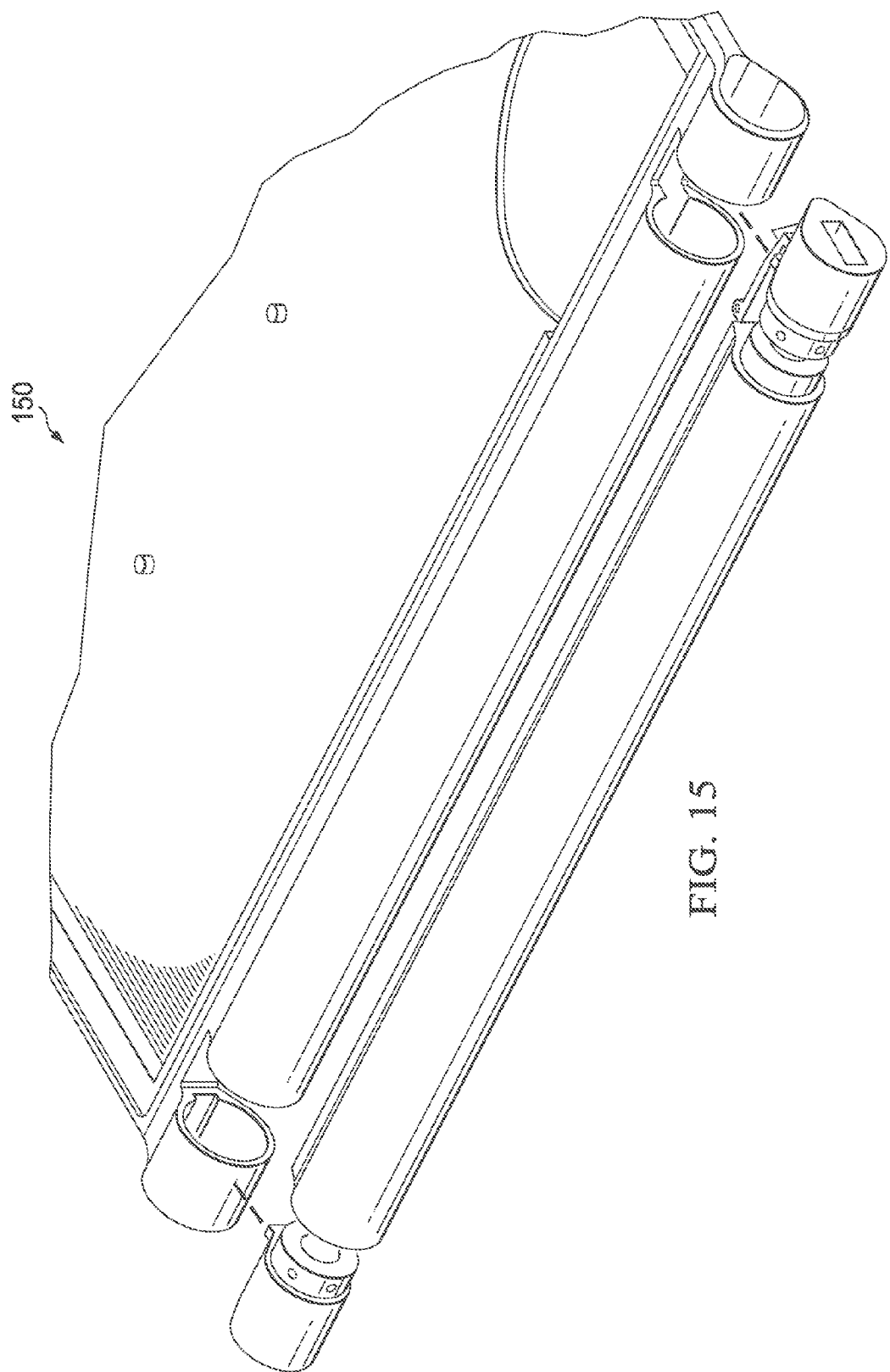
FIG. 15 is a simplified schematic diagram illustrating one potential design arrangement associated with the present disclosure.

FIG. 8 is a simplified schematic diagram illustrating an orthographic view of the keyboard electronics and magnetic bands 80 with the surrounding keyboard housing removed. FIG. 9 illustrates a keyboard housing 90 with the associated keyboard electronics and magnetic bands removed. FIG. 10 is a simplified schematic diagram illustrating a hinge assembly 100 associated with electronic device 10. FIGS. 11-14 are simplified schematic diagrams illustrating certain hinge assembly assembly components 110/120/130/140 associated with electronic device 10. The design and assembly mechanism of electronic device 10 allows assembly of the tablet disc into a slot that is smaller than the assembled disc. FIG. 15 is a simplified schematic diagram illustrating one potential design arrangement 150 associated with the present disclosure.

Figure 16:
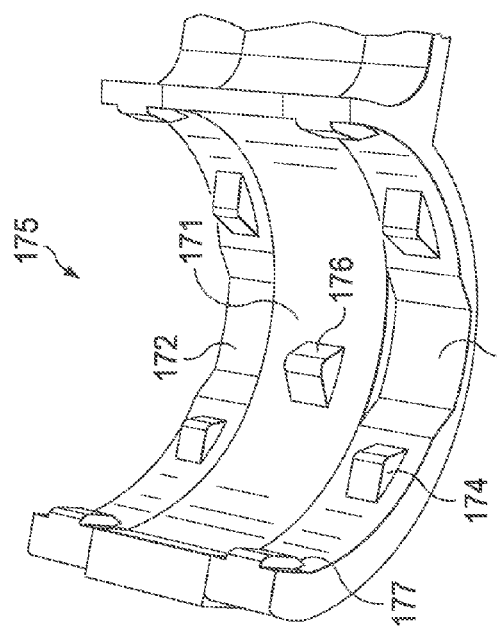
FIG. 16 is a simplified schematic diagram illustrating one potential snap-band configuration of the present disclosure.

FIG. 16 is a simplified schematic diagram illustrating one potential snap-band configuration 175 in accordance with one embodiment of the present disclosure. In certain example embodiments, the snap band on the keyboard can be used to retain the electronic device (e.g., instead of/or in conjunction with the use of magnets). In this particular example, a somewhat stiffer central section 171 can be provided, along with a more flexible set of side arms 172/173. In addition, a disc guide feature 174 is also provided in conjunction with a segment 177 that engages the tablet disc over the center (e.g., for retention purposes). Also provided in this particular embodiment is a tooth feature 176 that can engage the tablet disc toothed wheel for torque transmission.

In operation of one example embodiment, there is a three-piece snap for purposes of retention. Power signals can propagate through each of the three pieces separately. In addition, the power signals can run through the middle piece, where the two outer pieces operate as insulators. A keyboard side snap can be provided with one piece, where slots are used to allow for an independent motion of the outer snap bands and inner torque grabbing band/tooth. In yet other implementations, a one-piece snap can be provided without a separation of the three sections. It should be noted that any suitable plastic, fiber-reinforced plastic, highly elastic metal (e.g., titanium) can be used in such embodiments. Note also that for the one-piece snap, three-piece snap, and the magnetic retention can all be implemented without a clutch in the electronic device. For example, instead of using a clutch mechanism, the electronic device and the accessory can be held in position angularly with respect to one another (e.g., with the friction of their respective cylindrical mating surfaces).

Figure 18:
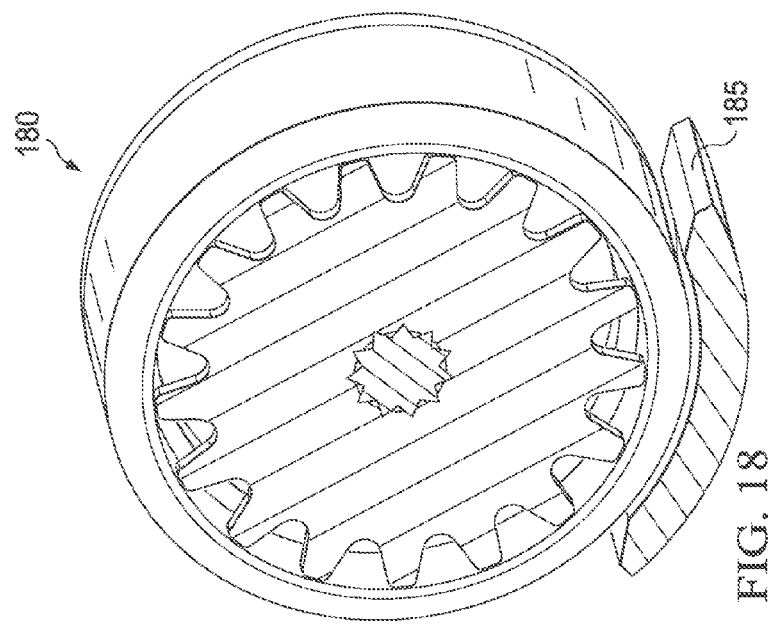
FIG. 18 is a simplified schematic diagram illustrating a cross-section of an engaged magnet with a ferrous ring band associated with the electronic device.
Figure 17:
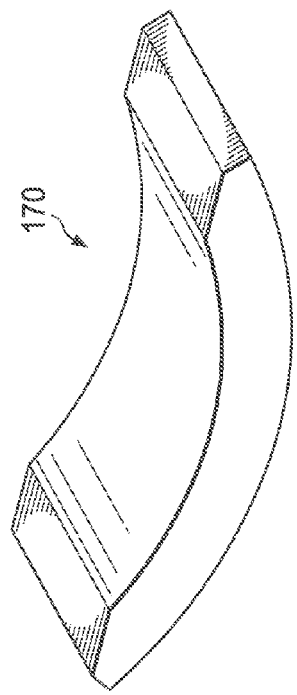
FIG. 17 is a simplified schematic diagram illustrating a magnet component associated with the electronic device.
Figure 19:
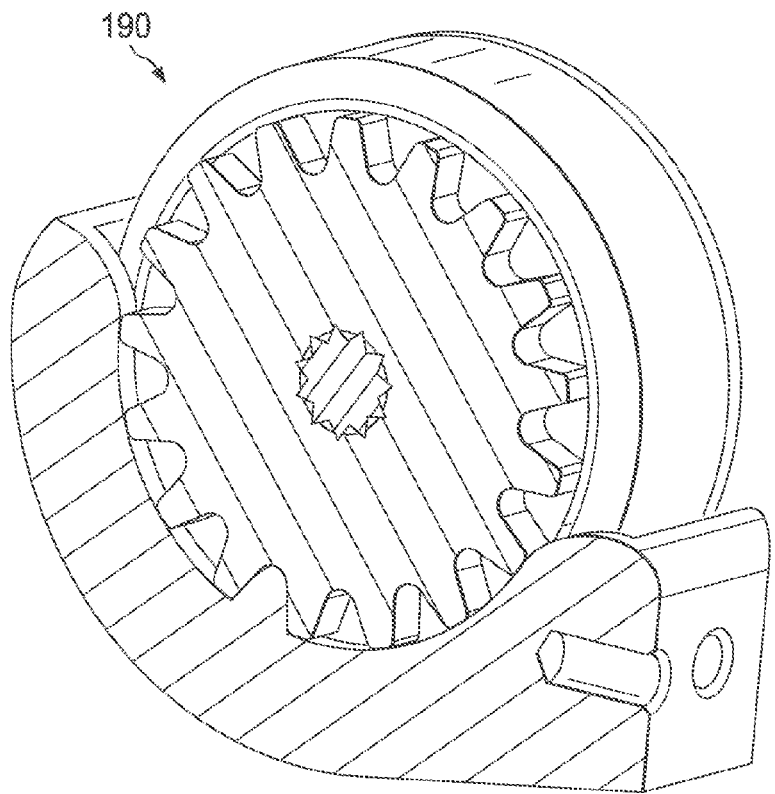
FIG. 19 is a simplified schematic diagram illustrating a cross-section of engaged teeth associated with a magnet of the electronic device.

FIG. 17 is a simplified schematic diagram illustrating a magnet component 170 associated with electronic device 10. In a particular embodiment, retention of the tablet to the keyboard is achieved through two arc-shaped ferrous steel components that may be embedded with four linearly polarized segment-shaped magnets. Magnets can attract ferrous steel ring bands that are part of the tablet socket modules. FIG. 18 is a simplified schematic diagram illustrating a cross-section of an engaged magnet 185 with a ferrous ring band 180 associated with electronic device 10. FIG. 19 is a simplified schematic diagram illustrating a cross-section of engaged teeth 190 associated with a magnet of electronic device 10. In a particular embodiment, angle adjustment and position hold can be achieved by engaging a single tooth built into the keyboard socket nest with the toothed disc.

Figure 20:
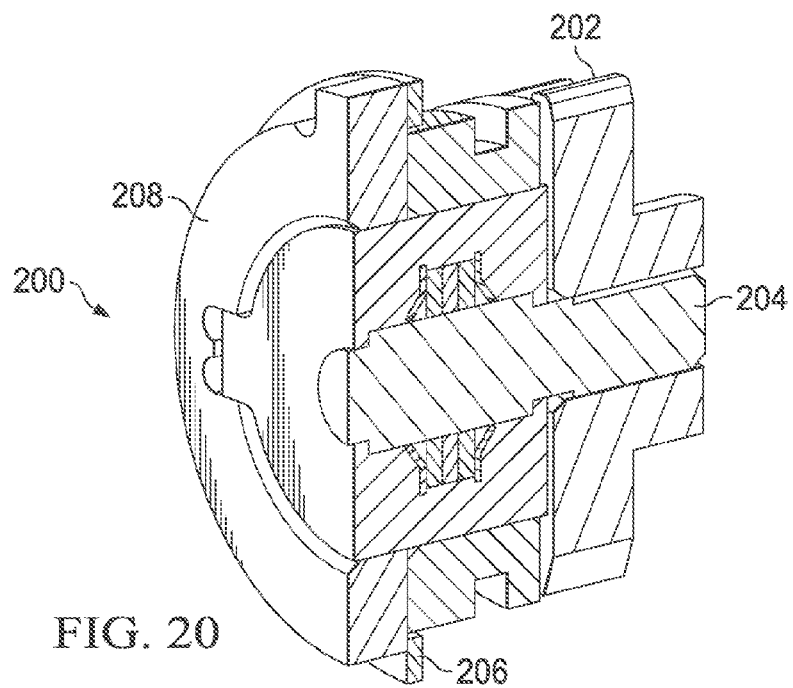
FIG. 20 is a simplified schematic diagram illustrating a cross-section of an assembly associated with the electronic device.

FIG. 20 is a simplified schematic diagram illustrating a cross-section of the internal features of a tablet disc assembly 200 associated with electronic device 10. This particular embodiment includes a hardened steel-toothed disc 202, a modified REELtorq insert (clutch element) 204, an electrical isolation washer 206, and a torque transition ring 208. Hence, there can be two REELTorq inserts (clutch elements) integrated in the tablet socket design. Alternative embodiments can use other clutch element mechanisms in place of these inserts. The hardened steel toothed disc could be integrated with (or appropriately assembled onto) the shortened shaft of the torque insert (e.g., press fit). Moreover, a custom over-molded engineered plastic (e.g., polycarbonate (PC) 20% glass fiber (GF) or equivalent) body can be provided that protects torque elements, adapts to the tablet barrel section, and electrically insulates the electrically "live" toothed disc.

In certain embodiments, the clutch mechanism does not have to be internal to the device discs (e.g., they can be in the area shown as being occupied by batteries in certain FIGURES). In essence, any clutch mechanism can be used in order to accommodate the teachings of the present disclosure. Additionally, friction forces do not have to be equal in both directions in certain embodiments of the present disclosure.

For the actual assembly, one of the two ferrous steel bands can be assembled with the torque insert and then inserted into the tablet by sliding it into the center barrel section with the second ferrous steel band loosely present over the center-toothed disc, which has a smaller outer diameter than the inner diameter of the ferrous steel band. Subsequently, the connector sub-assembly can be pushed in from the outside through the outer portion of the tablet barrel and the second ferrous steel band can be secured onto it.

Figure 21:
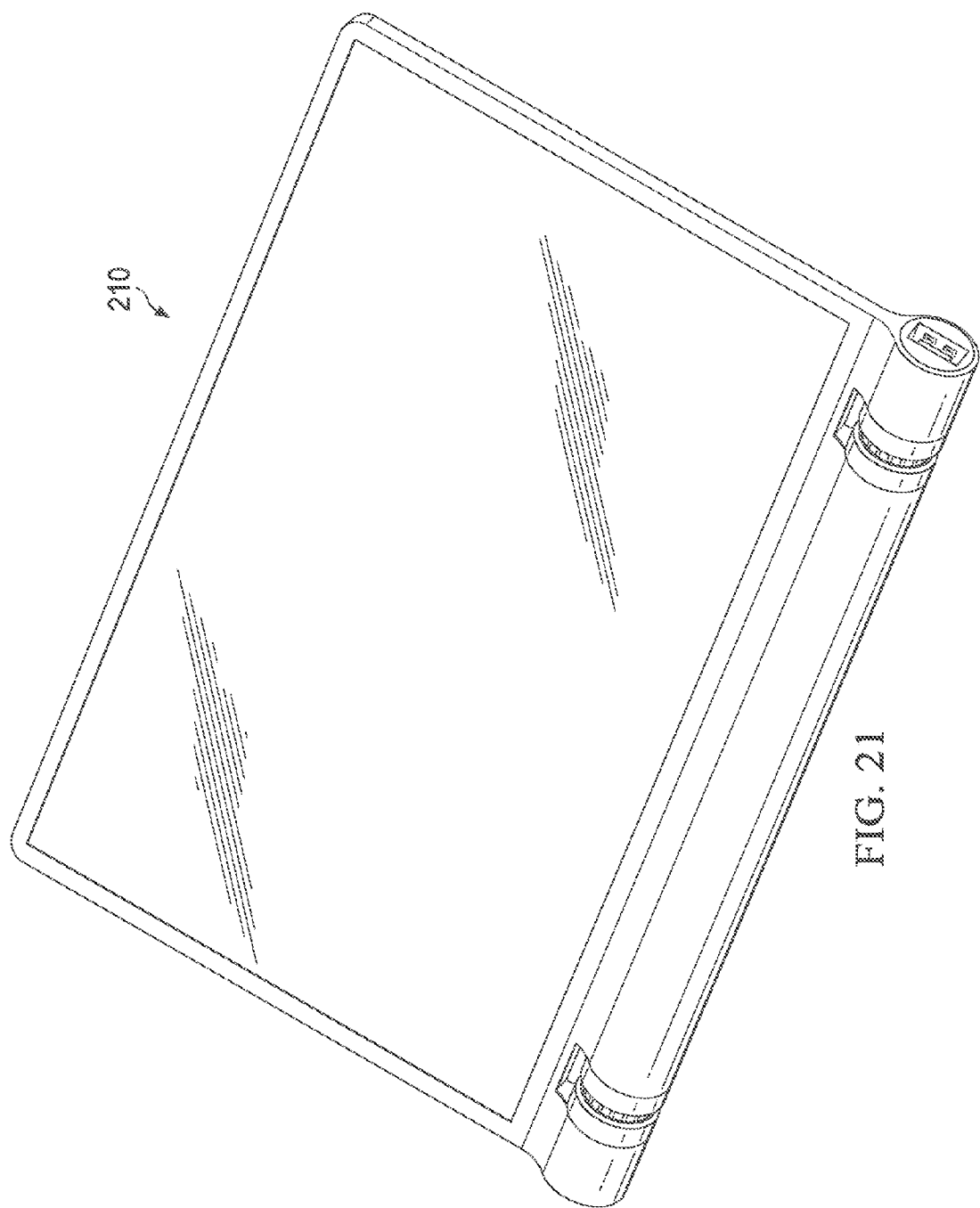
FIG. 21 is a simplified schematic diagram illustrating an embodiment of an electronic device consistent with this disclosure.
Figure 22:
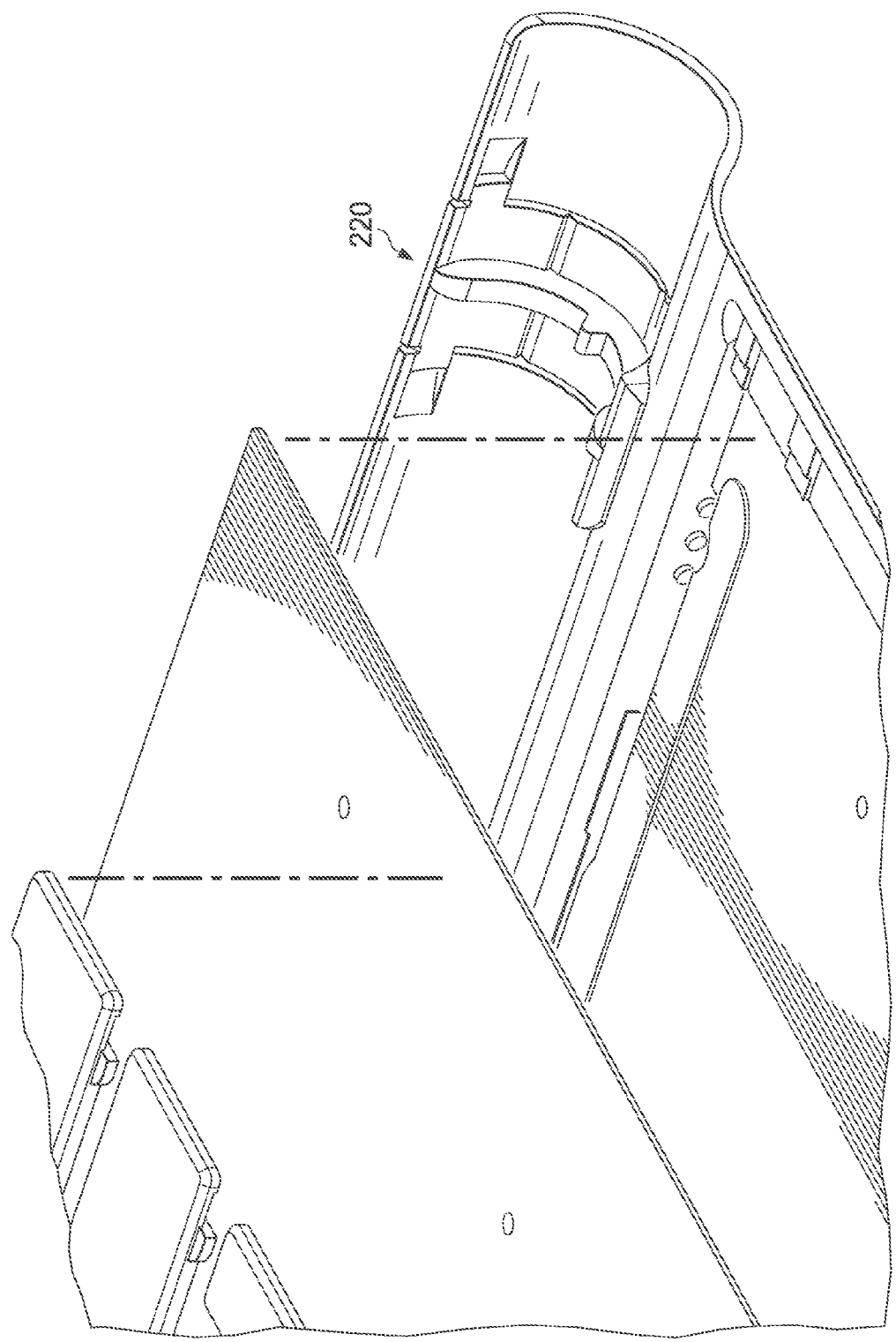
FIG. 22 is a simplified schematic diagram illustrating molded-in accessory docking feature bands and band magnets associated with an accessory device.

FIG. 21 is a simplified schematic diagram illustrating a potential battery configuration 210 associated with electronic device 10. Battery cells that reside within the tablet cylindrical barrel (through protective circuitry) can deliver current to the toothed discs that connect to (and power) the Bluetooth keyboard. FIG. 22 is a simplified schematic diagram illustrating insert-molded bands with engagement features and a band magnet assembly (generally indicated at 220) associated with electronic device 10. In this particular embodiment, a Bluetooth radio module is being illustrated in conjunction with a band, a band magnet, and three band support posts. The bands shown in FIG. 22 can house rare earth magnets that attract the discs in the tablet. The bands can be made from low-carbon steel that helps reduce stray magnetic fields emitting from the underside of the keyboard. Three band support posts can pass through the keyboard wall and be pressed into each band in accordance with one embodiment of the present disclosure. This can mechanically connect the bands to the keyboard and/or to pass electric power or signals from the bands to the internal region (circuitry) of the keyboard. The band and band magnet assembly can also be insert molded into the plastic keyboard body, which helps support the outboard tip of the keyboard body.

The band support posts can pass current from the tablet through the band and to the Bluetooth radio module. Because the discs in the tablet have an electric polarity and also have the ability to be inserted into the keyboard in multiple orientations, a DC rectifier can be used on the Bluetooth radio module. The band support posts can also anchor the bands to help transmit and distribute loads to the keyboard. A single center tooth on the band can mate with the toothed disc in the tablet to prevent unwanted toothed disc rotation with respect to the keyboard and, further, allow the tablet to be inserted into the keyboard in both possible orientations. Because the bands touch the electrically live-toothed discs of the tablet, the bands can become electrically charged, so they can be electrically isolated from other metal components of the keyboard, though proper keyboard and tablet electronic circuit design may also be used to eliminate this need.

In certain embodiments, instead of passing power signals through the toothed wheel, certain configurations can pass power signals through one or a plurality of discs with wiping contacts on the accessory side. Other configurations can pass power signals through disc features that are not necessarily the ferrous features being shown, but any other ring of metal could be used as a contact. In yet other examples, power signals can be passed through a plug-in connector (e.g., whose male side protrusion is built into the keyboard side and whose female side is built into the electronic device). This could effectively make the electrical connection and, further, could be used as the sole point of torque transmission between the keyboard and the tablet. Note that such an embodiment is like a scaled-up version of the tooth engaging in the toothed wheel. This might not necessarily be ideal in that it may only allow the tablet and keyboard (or any other accessory) to be connected when they are in one orientation. Virtually any other electrical connection methods could be used and, thus, are clearly within the scope of the present disclosure. Additionally, alternative constructions for the barrel and scoop (which come together at the hinge) could be used without departing from the teachings of present disclosure. Although potentially cumbersome, such configurations represent viable alternative embodiments of the present disclosure.

Figure 23:
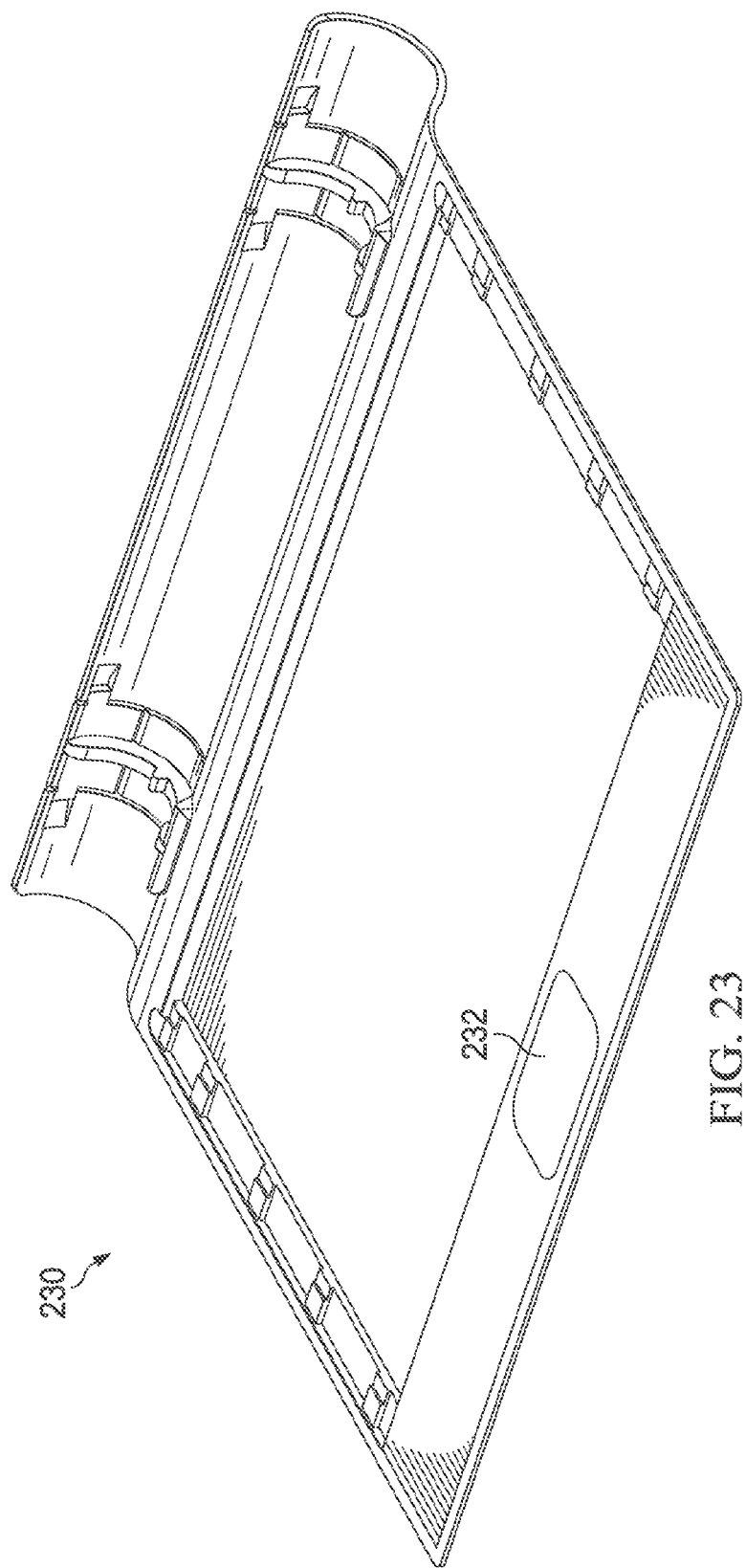
FIG. 23 is a simplified schematic diagram illustrating a latch magnet associated with the electronic device.

FIG. 23 is a simplified schematic diagram illustrating a latch magnet 230 associated with electronic device 10 having a touch pad section 232. In a particular example implementation, rare earth magnets with alternating polarity and a steel backplate are used to reduce stray magnetic fields through the underside of the keyboard and, further, to concentrate the magnetic fields in the direction of the tablet. For example, beneath the wrist pad depicted in FIG. 23, three rare earth magnets with alternating polarity can be suitably mounted. The latch magnets can attract an associated magnet/snap plate combination mounted in the tablet. The steel backplate in the keyboard can concentrate the magnetic fields from the latch magnets and direct it upward, toward the tablet to help keep the device closed. The latch magnet can be designed to have an equal closing force when the device is in laptop mode and nested tablet mode.

Figure 25:
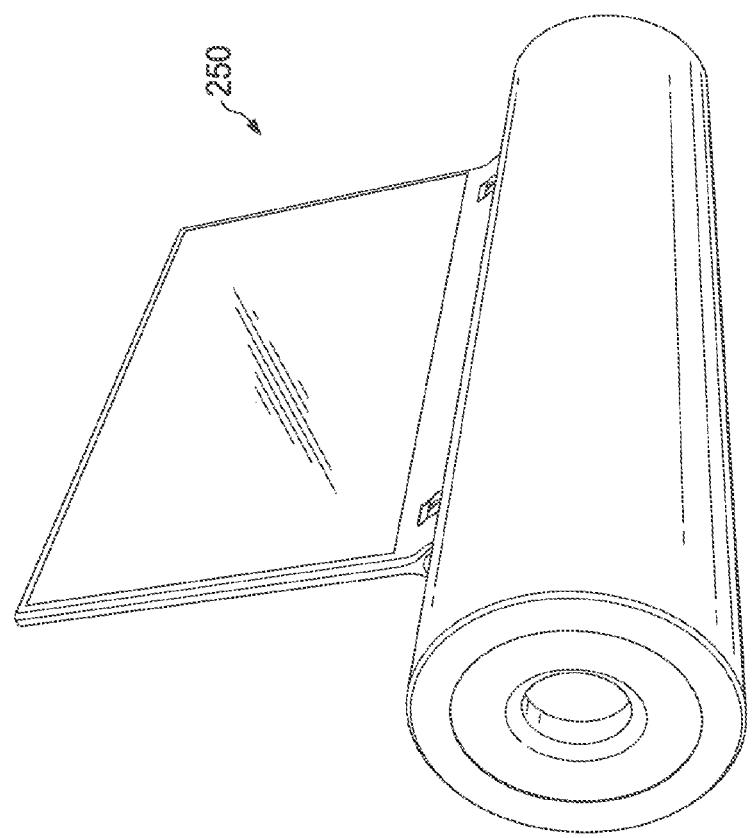
FIG. 25 is a simplified schematic diagram illustrating an speaker embodiment associated with the electronic device.
Figure 24:
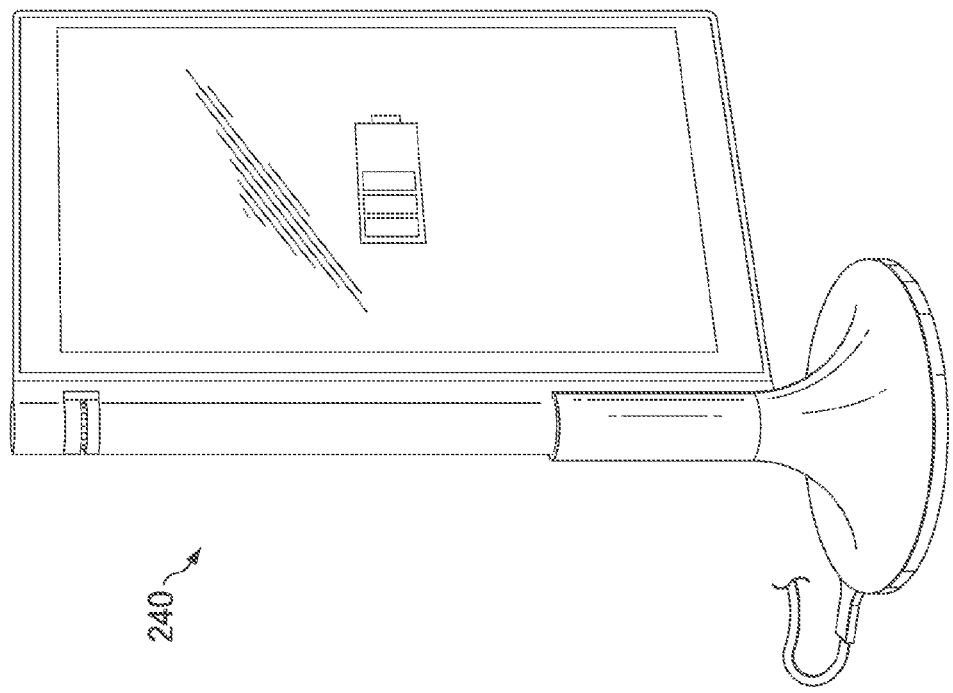
FIG. 24 is a simplified schematic diagram illustrating a docking station embodiment associated with the electronic device.

FIG. 24 is a simplified schematic diagram illustrating an alternative docking station 240 embodiment associated with electronic device 10. As a general proposition, the disc hinge design of the present disclosure (with power isolated from the chassis) enables a more fully integrated tablet accessory capability, thus engendering countless functioning tablet accessories. For example, docking station 240 is one such implementation. FIG. 25 is a simplified schematic diagram illustrating an alternative speaker embodiment 250 associated with electronic device 10. Any suitable audio system can be provisioned in conjunction with the present disclosure, as the depiction of FIG. 25 is only being offered by way of example.

Figure 26:
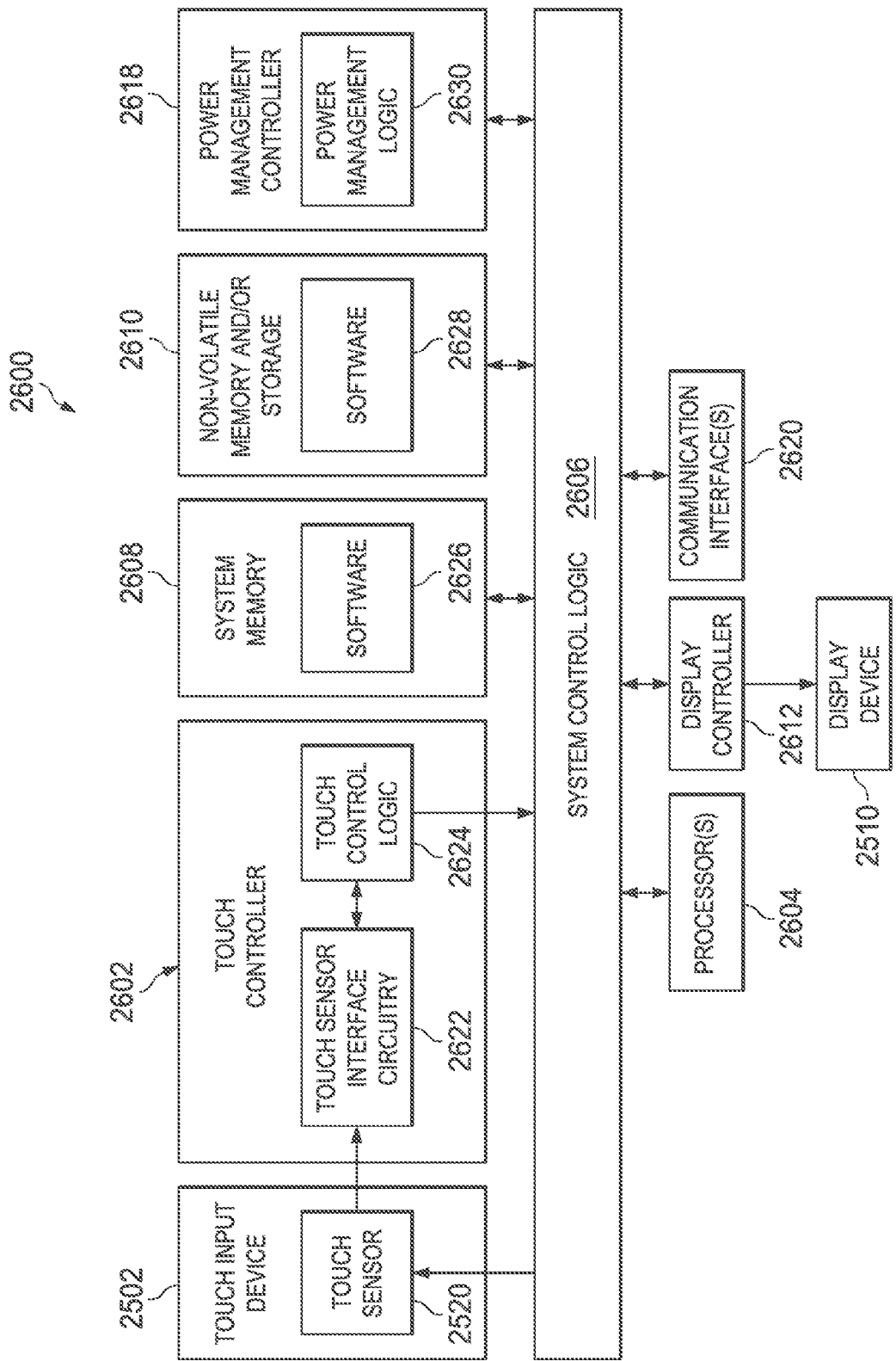
FIG. 26 is a simplified block diagram illustrating potential electronics associated with the electronic device.

FIG. 26 is a simplified block diagram illustrating potential electronics associated with electronic device 10. More particularly, FIG. 26 illustrates an embodiment of an example system 2600 that may be included in any portion (or shared by portions) of electronic device 10. System 2600 includes a touch input device 2502, a touch controller 2602, one or more processors 2604, system control logic 2606 coupled to at least one of processor(s) 2604, system memory 2608 coupled to system control logic 2606, non-volatile memory and/or storage device(s) 2610 coupled to system control logic 2606, display controller 2612 coupled to system control logic 2606, display controller 2612 coupled to a display, power management controller 2618 coupled to system control logic 2606, and communication interfaces 2620 coupled to system control logic 2606.

Touch input device 2502 includes touch sensor 2520 and each may be implemented using any suitable touch-sensitive technology such as, for example and without limitation, capacitive, resistive, surface acoustic wave (SAW), infrared, and optical imaging. Touch input device 2502, in a particular embodiment, may be implemented using any suitable multi-touch technology.

System control logic 2606, in a particular embodiment, may include any suitable interface controllers to provide for any suitable interface to at least one processor 2604 and/or to any suitable device or component in communication with system control logic 2606. System control logic 2606, in a particular embodiment, may include one or more memory controllers to provide an interface to system memory 2608. System memory 2608 may be used to load and store data and/or instructions, for example, for system 2600. System memory 2608, in a particular embodiment, may include any suitable volatile memory, such as suitable dynamic random access memory (DRAM) for example. System control logic 2606, in a particular embodiment, may include one or more input/output (I/O) controllers to provide an interface to a display device, touch controller 2602, and non-volatile memory and/or storage device(s) 2610.

Non-volatile memory and/or storage device(s) 2610 may be used to store data and/or instructions, for example within software 2628. Non-volatile memory and/or storage device(s) 2610 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 2618 includes power management logic 2630 configured to control various power management and/or power saving functions of electronic device 10 based upon whether electronic device 10 is in an open configuration or a closed configuration and/or a physical orientation of electronic device 10. In one embodiment, power management controller 2618 is configured to reduce the power consumption of components or devices of system 2600 that may either be operated at reduced power or turned off when electronic device 10 is in the closed configuration. For example, in a particular embodiment when electronic device 10 is in a closed configuration, power management controller 2618 may perform one or more of the following: power down the unused portion of the display and/or any backlight associated therewith; allow one or more of processor(s) 2604 to go to a lower power state if less computing power is required in the closed configuration; and shutdown any devices and/or components, such as keyboard 108, that are unused when electronic device 10 is in the closed configuration.

Communications interface(s) 2620 may provide an interface for system 2600 to communicate over one or more networks and/or with any other suitable device. Communications interface(s) 2620 may include any suitable hardware and/or firmware. Communications interface(s) 2620, in a particular embodiment, may include, for example, a network adapter, a wireless network adapter, a telephone modem, and/or a wireless modem.

System control logic 2606, in a particular embodiment, may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For one embodiment, at least one processor 2604 may be packaged together with logic for one or more controllers of system control logic 2606. In one embodiment, at least one processor 2604 may be packaged together with logic for one or more controllers of system control logic 2606 to form a System in Package (SiP). In one embodiment, at least one processor 2604 may be integrated on the same die with logic for one or more controllers of system control logic 2606. For a particular embodiment, at least one processor 2604 may be integrated on the same die with logic for one or more controllers of system control logic 2606 to form a System on Chip (SoC).

For touch control, touch controller 2602 may include touch sensor interface circuitry 2622 and touch control logic 2624. Touch sensor interface circuitry 2622 may be coupled to detect touch input over a first touch surface layer and a second touch surface layer of display 26 (i.e., display device 2510). Touch sensor interface circuitry 2622 may include any suitable circuitry that may depend, for example, at least in part on the touch-sensitive technology used for touch input device 2502. Touch sensor interface circuitry 2622, in one embodiment, may support any suitable multi-touch technology. Touch sensor interface circuitry 2622, in one embodiment, may include any suitable circuitry to convert analog signals corresponding to a first touch surface layer and a second surface layer into any suitable digital touch input data. Suitable digital touch input data for one embodiment may include, for example, touch location or coordinate data.

Touch control logic 2624 may be coupled to help control touch sensor interface circuitry 2622 in any suitable manner to detect touch input over a first touch surface layer and a second touch surface layer. Touch control logic 2624 for one embodiment may also be coupled to output in any suitable manner digital touch input data corresponding to touch input detected by touch sensor interface circuitry 2622. Touch control logic 2624 may be implemented using any suitable logic, including any suitable hardware, firmware, and/or software logic (e.g., non-transitory tangible media), that may depend, for example, at least in part on the circuitry used for touch sensor interface circuitry 2622. Touch control logic 2624 for one embodiment may support any suitable multi-touch technology.

Touch control logic 2624 may be coupled to output digital touch input data to system control logic 2606 and/or at least one processor 2604 for processing. At least one processor 2604 for one embodiment may execute any suitable software to process digital touch input data output from touch control logic 2624. Suitable software may include, for example, any suitable driver software and/or any suitable application software. As illustrated in FIG. 26, system memory 2608 may store suitable software 2626 and/or non-volatile memory and/or storage device(s).

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense. It should also be noted that the terms 'electronic device' and 'tablet' have been used interchangeably herein in this document.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation may include means for receiving a plurality of segments of an accessory at an electronic device that includes a plurality of discs provided as part of a hinge assembly. The implementation may also include means for engaging the hinge assembly with the accessory to secure a top portion of the electronic device to the accessory, wherein the hinge assembly is to allow a rotation of the top portion in relation to the accessory. The actual hinge assembly may include a disc-toothed wheel to receive the plurality of segments of the accessory in order to secure the top portion to the accessory. In addition, the accessory may include a tooth segment to provide an alignment function as the hinge assembly engages the accessory. Additionally, the accessory may include one or more magnetic bands that attract one or more rings provided in the top portion. Additionally, the accessory may include stiff but flexible bands that can retain one or more rings or discs provided in the top portion by means of a general snapping or over-center snapping mechanism.

What is claimed is:

1. An electronic device, comprising:
a hinge assembly to removably couple a portion of the electronic device to an accessory, wherein the hinge assembly is to allow a rotation around an axis of the portion in relation to the accessory when the portion is coupled to the accessory, the hinge assembly includes a snap to provide a retention force between the portion and the accessory when the portion is coupled to the accessory, the hinge assembly includes a toothed disc to mate with the accessory to resist rotation between the portion and the accessory when the portion is coupled to the accessory, and the toothed disc is centered on the axis.

2. The electronic device of claim 1, wherein the snap includes three pieces, and the electronic device further comprises three power signal pathways that run separately through respective ones of the three pieces.

3. The electronic device of claim 1, wherein the snap includes three pieces, and the electronic device further comprises a power signal pathway that runs through a middle piece of the three pieces, wherein two outer pieces of the three pieces are insulators.

4. The electronic device of claim 1, wherein the accessory is a keyboard that includes a keyboard side snap with one piece, and wherein a plurality of slots allow an independent motion of outer snap bands of the keyboard.

5. The electronic device of claim 1, wherein the accessory includes a portion of a ferrous housing to reduce one or more stray magnetic fields.

6. The electronic device of claim 1, wherein the accessory includes one or more rare earth magnets to attract one or more discs of the hinge assembly of the electronic device.

7. The electronic device of claim 1, wherein the accessory includes a band and a band support post to anchor the band, and wherein the band support post is to pass current from the portion through the band to power the accessory.

8. The electronic device of claim 1, wherein the portion includes a touch display.

9. The electronic device of claim 1, wherein the accessory includes an audio component.

10. The electronic device of claim 1, wherein the accessory is a docking station.

11. The electronic device of claim 1, wherein the accessory includes a keyboard.

12. The electronic device of claim 1, wherein the hinge assembly is to provide a range of rotation to the electronic device relative to the accessory, the range of rotation extending from 0° in a closed position to 150° in a substantially open position.

13. The electronic device of claim 1, wherein the accessory includes an arced cavity to receive the hinge assembly.

14. The electronic device of claim 13, wherein the arced cavity is shaped as a portion of a cylinder.

15. An accessory for an electronic device, comprising:
A first snap component to removably mate the accessory with the electronic device such that the accessory is allowed to rotate relative to the electronic device around an axis, wherein the electronic device includes a complementary second snap component to provide a retention force between the electronic device and the accessory when the first and second snap components are mated, wherein the accessory includes a tooth to mate with a toothed disc of the electronic device to resist rotation between the accessory and the electronic device when the electronic device is mated to the accessory, and wherein the toothed disc is centered on the axis.

16. The accessory of claim 15, wherein the second snap component includes three pieces, and the accessory is to receive power signals that run separately through respective ones of the three pieces.

17. The accessory of claim 15, wherein the second snap component includes three pieces, the accessory is to receive a power signal that runs through a middle piece of the three pieces, and two outer pieces of the three pieces are insulators.

18. The accessory of claim 15, further including a keyboard, a docking station, or an audio component.

19. The accessory of claim 15, further including a cavity to receive a portion of the electronic device.

20. The accessory of claim 15, further including one or more rare earth magnets.

21. The accessory of claim 15, further including a band and a band support post to anchor the band.

22. The accessory of claim 21, wherein the band support post is to pass current from the electronic device through the band to power the accessory.

23. The accessory of claim 15, wherein the second snap component is shaped as a portion of a cylinder, and the first snap component is shaped to curve around the second snap component.

24. A computing device, comprising:
an electronic device including a processing device and a hinge assembly, wherein the hinge assembly is to removably couple the electronic device to an accessory, the hinge assembly is to allow a rotation around an axis of the portion in relation to the accessory when the portion is coupled to the accessory, the hinge assembly includes a snap to provide a retention force between the portion and the accessory when the portion is coupled to the accessory, the hinge assembly includes a toothed disc to mate with the accessory to resist rotation between the portion and the accessory when the portion is coupled to the accessory, and the toothed disc is centered on the axis; and
the accessory.

25. The computing device of claim 24, wherein the electronic device includes a touchscreen.

* * * * *